US012644026B2

(12) United States Patent
Bieber et al.

(10) Patent No.: US 12,644,026 B2
(45) Date of Patent: Jun. 2, 2026

(54) CO-EXTRUDED RUBBER-BASED MULTILAYER ADHESIVE ASSEMBLY

(71) Applicant: 3M INNOVATIVE PROPERTIES COMPANY, St. Paul, MN (US)

(72) Inventors: Pierre Bieber, Korschenbroich (DE); Niklas Matzeit, Bergheim (DE); Petra Stegmaier, Duesseldorf (DE); Doreen Eckhardt, Dormagen (DE); Robert D. Waid, Maplewood, MN (US); Eike Klünker, Kaarst (DE)

(73) Assignee: 3M Innovative Properties Company, St. Paul, MN (US)

( * ) Notice: Subject to any disclaimer, the term of this patent is extended or adjusted under 35 U.S.C. 154(b) by 696 days.

(21) Appl. No.: 17/273,033

(22) PCT Filed: Nov. 21, 2019

(86) PCT No.: PCT/IB2019/060047
§ 371 (c)(1),
(2) Date: Mar. 3, 2021

(87) PCT Pub. No.: WO2020/105000
PCT Pub. Date: May 28, 2020

(65) Prior Publication Data
US 2021/0324244 A1    Oct. 21, 2021

(30) Foreign Application Priority Data

Nov. 23, 2018    (EP) ..................................... 18207960

(51) Int. Cl.
*C09J 7/38*        (2018.01)
*B29C 48/18*        (2019.01)
(Continued)

(52) U.S. Cl.
CPC ............... *C09J 7/387* (2018.01); *B29C 48/18* (2019.02); *C09J 7/35* (2018.01); *C09J 11/08* (2013.01);
(Continued)

(58) Field of Classification Search
None
See application file for complete search history.

(56) References Cited

U.S. PATENT DOCUMENTS

| 4,563,388 A | 1/1986 | Bonk |
| 5,296,547 A | 3/1994 | Nestegard |
| (Continued) | | |

FOREIGN PATENT DOCUMENTS

| DE | 202009013255 | 2/2010 |
| EP | 0384598 | 8/1990 |
| (Continued) | | |

OTHER PUBLICATIONS

Pocius, Adhesion and Adhesives Technology: An Introduction, 2nd Ed., 2002 Table of Content, 8 Pages.
(Continued)

*Primary Examiner* — Chinessa T. Golden
(74) *Attorney, Agent, or Firm* — Carlos M. Téllez Rodríguez; 3M Innovative Properties Co

(57)    ABSTRACT

The present disclosure relates to a co-extruded multilayer adhesive assembly comprising: a) a heat-activatable adhesive resin layer comprising a (co)polymer of one or more monomers selected from the group consisting of olefins; and b) a pressure sensitive adhesive polymeric foam layer comprising a rubber-based elastomeric material; wherein the heat-activatable adhesive resin layer is in direct contact with the pressure sensitive adhesive foam layer, and wherein the surface of the heat-activatable adhesive resin layer which is in direct contact with the pressure sensitive adhesive foam
(Continued)

layer and the surface of the pressure sensitive adhesive foam layer which is indirect contact with the heat-activatable adhesive resin layer are free of any chemical or physical adhesion-promoting surface treatment. The present disclosure also relates to a method of manufacturing such a co-extruded multilayer adhesive assembly and uses thereof.

16 Claims, 1 Drawing Sheet

(51) Int. Cl.

| | | |
|---|---|---|
| *C09J 7/35* | (2018.01) |
| *C09J 11/08* | (2006.01) |
| *C09J 123/12* | (2006.01) |
| *C09J 153/02* | (2006.01) |
| *C09J 165/00* | (2006.01) |

(52) U.S. Cl.

CPC ........... *C09J 123/12* (2013.01); *C09J 153/02* (2013.01); *C09J 165/00* (2013.01); *C09J 2301/208* (2020.08); *C09J 2301/302* (2020.08); *C09J 2301/304* (2020.08); *C09J 2301/412* (2020.08); *C09J 2301/414* (2020.08)

(56) References Cited

U.S. PATENT DOCUMENTS

| | | | |
|---|---|---|---|
| 5,322,709 | A | 6/1994 | Lulla |
| 5,393,787 | A | 2/1995 | Nestegard |
| 5,605,964 | A | 2/1997 | Groves |
| 5,677,376 | A | 10/1997 | Groves |
| 5,877,261 | A | 3/1999 | Harder |
| 6,858,676 | B1 | 2/2005 | Johoji |
| 7,163,741 | B2 | 1/2007 | Khandpur |
| 7,910,163 | B2 | 3/2011 | Zollner |
| 8,449,962 | B2 | 5/2013 | Prenzel |
| 8,802,777 | B2 | 8/2014 | Zöllner |
| 9,505,959 | B2 | 11/2016 | Grittner |
| 2003/0082362 | A1 | 5/2003 | Khandpur |
| 2004/0082700 | A1 | 4/2004 | Khandpur |
| 2005/0288436 | A1 | 12/2005 | Ring |
| 2009/0053447 | A1 | 2/2009 | Zollner |
| 2011/0274843 | A1 | 11/2011 | Grittner |
| 2011/0281964 | A1 | 11/2011 | Zmarsly |
| 2012/0029105 | A1 | 2/2012 | Czerwonatis |
| 2014/0057091 | A1 | 2/2014 | Krawinkel |
| 2015/0159053 | A1 | 6/2015 | Schümann |
| 2016/0152871 | A1* | 6/2016 | Bieber ............... C08L 23/0815 |
| | | | 521/140 |
| 2016/0368355 | A1* | 12/2016 | Richert .................... C09J 7/241 |
| 2017/0260424 | A1 | 9/2017 | Ellringmann |
| 2017/0321089 | A1* | 11/2017 | Goeb ......................... C09J 7/38 |

FOREIGN PATENT DOCUMENTS

| | | |
|---|---|---|
| EP | 1262532 | 12/2002 |
| JP | 8-3523 | 1/1996 |
| WO | WO 2001-044400 | 6/2001 |
| WO | 2007149851 A1 | 12/2007 |
| WO | WO 2014/088999 A2 | 6/2014 |
| WO | 2015017414 A1 | 2/2015 |
| WO | 2016077133 A1 | 5/2016 |

OTHER PUBLICATIONS

1507 Extended EP Search Report for EP18207960-8, Date Jun. 7, 2019, 7pgs.

International Search Report for PCT International Application No. PCT/IB2019/060047, mailed on Jan. 9, 2020, 4 pages.

* cited by examiner

CO-EXTRUDED RUBBER-BASED MULTILAYER ADHESIVE ASSEMBLY

CROSS REFERENCE TO RELATED APPLICATIONS

This application is a national stage filing under 35 U.S.C. 371 of PCT/IB2019/060047, filed Nov. 21, 2019, which claims the benefit of European Patent Application No. 18207960.8, filed Nov. 23, 2018, the disclosures of which are incorporated by reference in their entirety herein.

TECHNICAL FIELD

The present disclosure relates generally to the field of pressure sensitive adhesives (PSA), more specifically to the field of dual-functional multilayer pressure sensitive adhesive assemblies. The present disclosure also relates to a method of manufacturing such pressure sensitive adhesive assemblies and uses thereof.

BACKGROUND

Adhesives have been used for a variety of marking, holding, protecting, sealing and masking purposes. Adhesive tapes generally comprise a backing, or substrate, and an adhesive. One type of adhesive which is particularly preferred for many applications is represented by pressure sensitive adhesives.

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

Pressure sensitive adhesives (PSAs) are well known to one of ordinary skill in the art, and according to the Pressure-Sensitive Tape Council, PSAs are known to possess properties including the following: (1) aggressive and permanent tack, (2) adherence with no more than finger pressure, (3) sufficient ability to hold onto an adherend, and (4) sufficient cohesive strength. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, 2$^{nd}$ Ed., Hanser Gardner Publication, Cincinnati, OH, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. Many applications require pressure sensitive adhesives to support a load at elevated temperatures, typically in the range of from 70° C. to 120° C., for which high cohesive strengths are required. Similarly, an increased need has arisen for pressure sensitive adhesives having improved and versatile adhesion characteristics; in particular with respect to peel forces and shear resistance on various types of difficult to adhere surfaces, such as in particular the so-called low surface energy (LSE) and medium surface energy (MSE) substrates.

In that context, multilayer pressure sensitive adhesive assemblies are known to provide better flexibility and versatility in terms of bonding performance. However, known multilayer pressure sensitive adhesive assemblies typically suffer from lack of sufficient anchoring between layers, which may lead to delamination between layers, especially at high temperature. This is particularly the case with the so-called dual-functional adhesive tapes comprising typically a heat-activatable polyolefin adhesive and a layer of acrylic-type pressure sensitive adhesive, and which typically suffer from insufficient two-bond failure resistance. Partial solutions have been described e.g. in U.S. Pat. No. 4,563, 388 (Bonk et al.), in EP-A1-0 384 598 (Johnson et al.), in EP-A1-1 262 532 (Valdez), and in US 2015/0159053 A1 (Schümann et al.). The described solutions generally involve complex and costly manufacturing processes.

In addition to increasing performance requirements with regard to pressure sensitive adhesives, volatile organic compounds (VOC) reduction regulations are becoming increasingly important in particular for various kind of interior applications (occupational hygiene and occupational safety) such as e.g. in the construction market or in the automotive or electronics industries. Known acrylate-based pressure sensitive adhesives typically contain notable amounts of low molecular weight organic residuals, such as un-reacted monomers arising from their polymerization process, polymerization initiator residuals, contaminations from raw materials or degradation products formed during the manufacturing process. These low molecular weight residuals qualifying as VOC may diffuse out of the adhesive tape and can be potentially harmful. Known acrylate-based pressure sensitive adhesives, if not crosslinked, also generally suffer from lack of cohesive strength and excessive tendency to flow. This aspect may render the application and processability of uncrosslinked acrylate-based pressure sensitive adhesives particularly problematic, especially when made by a hotmelt process.

The reduction of organic solvent usage in the manufacturing process of pressure sensitive adhesives has quickly emerged as one straightforward means to reduce the overall VOC levels. The use of specific scavengers for organic contaminants, as described in WO 01/44400 (Yang), is another alternative way to achieve reduced VOC levels. However, the solutions for reducing overall VOC levels known from the prior art are often associated with increased manufacturing complexity and production costs.

The pressure sensitive adhesive materials known from the prior art do not often provide sufficient robustness and/or tack to various types of substrate, including the so-called LSE and MSE substrates, in combination with reduced VOC level characteristics. In particular, the overall VOC levels observed do often not fulfill the requirements for various kind of interior applications such as e.g. in the construction market or in the automotive or electronics industries. Partial solutions have been described e.g. in US 2003/0082362 A1 (Khandpur et al.), in US 2004/0082700 A1 (Khandpur et al.), and in US 2014/0057091 A1 (Krawinkel et al.).

Without contesting the technical advantages associated with the pressure sensitive adhesives known in the art, there is still a need for a robust and cost-effective multilayer pressure sensitive adhesive assembly providing excellent and versatile adhesion characteristics, in particular with respect to various types of substrate, including LSE and MSE substrates, whilst providing reduced overall VOC levels.

SUMMARY

According to one aspect, the present disclosure relates to a co-extruded multilayer adhesive assembly comprising:

a) a heat-activatable adhesive resin layer comprising a (co)polymer of one or more monomers selected from the group consisting of olefins; and b) a pressure sensitive adhesive polymeric foam layer comprising a rubber-based elastomeric material;

wherein the heat-activatable adhesive resin layer is in direct contact with the pressure sensitive adhesive foam layer, and wherein the surface of the heat-activatable adhesive resin layer which is in direct contact with the pressure sensitive adhesive foam layer and the surface of the pressure sensitive adhesive foam layer which is in direct contact with the heat-activatable adhesive resin layer are free of any chemical or physical adhesion-promoting surface treatment.

In another aspect, the present disclosure is directed to a method of manufacturing a co-extruded multilayer adhesive assembly as described above, which comprises the step of hotmelt co-extruding the pressure sensitive polymeric foam layer and the heat-activatable adhesive resin layer.

In still another aspect of the present disclosure, it is provided a composite article comprising a co-extruded multilayer adhesive assembly as described above, wherein the heat-activatable adhesive resin layer has a first major surface in direct contact with the pressure sensitive polymeric foam layer and a second major surface bonded to a rubber seal article.

According to still another aspect, the present disclosure relates to the use of a co-extruded multilayer pressure sensitive adhesive assembly as described above for industrial applications, preferably for interior applications, more preferably for construction market applications and transportation market applications.

DETAILED DESCRIPTION

Figure 1:
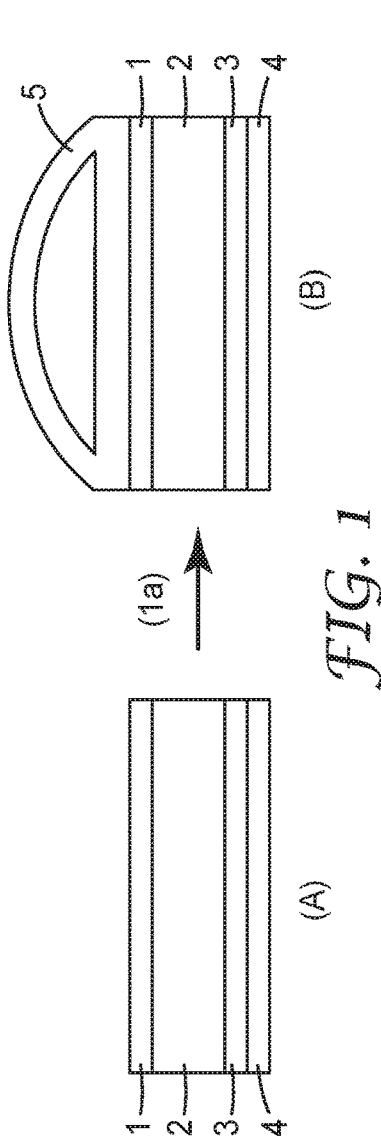
FIG. 1 illustrates an exemplary co-extruded multilayer adhesive assembly according to one aspect of the present disclosure, and an exemplary method of manufacturing an exemplary composite article according to another aspect of the present disclosure.

According to a first aspect, the present disclosure relates to a co-extruded multilayer adhesive assembly comprising:

a) a heat-activatable adhesive resin layer comprising a (co)polymer of one or more monomers selected from the group consisting of olefins; and b) a pressure sensitive adhesive polymeric foam layer comprising a rubber-based elastomeric material;

wherein the heat-activatable adhesive resin layer is in direct contact with the pressure sensitive adhesive foam layer, and wherein the surface of the heat-activatable adhesive resin layer which is in direct contact with the pressure sensitive adhesive foam layer and the surface of the pressure sensitive adhesive foam layer which is in direct contact with the heat-activatable adhesive resin layer are free of any chemical or physical adhesion-promoting surface treatment.

According to a typical aspect, the co-extruded multilayer adhesive assembly of the disclosure is obtained by co-extrusion of the pressure sensitive adhesive polymeric foam layer and the heat-activatable adhesive resin layer.

In the context of the present disclosure, it has been surprisingly found that a co-extruded multilayer adhesive assembly as described above provides outstanding robustness as well as excellent and versatile adhesion characteristics, in particular with respect to various types of substrates, including LSE and MSE substrates, whilst providing excellent characteristics and performance as to overall VOC levels reduction.

In addition, the co-extruded multilayer adhesive assemblies as described herein provide surprisingly good overall balance of adhesive and cohesive characteristics (in particular with respect to peel forces and static shear resistance) on various types of substrates, including LSE and MSE substrates, and in particular on automotive clear coats, automotive varnishes or automotive paints.

Advantageously, the multilayer pressure sensitive adhesive assemblies according to the present disclosure provide excellent surface and interface properties, which is particularly surprising in those executions where the polymeric foam layer is foamed with expandable microspheres. Without wishing to be bound by theory, it is believed that these outstanding properties are due to the compounds used to form the pressure sensitive adhesive polymeric foam layer and the heat-activatable adhesive resin layer being in melted state at the time the co-extrusion process step is performed. This results into smoother surface of the pressure sensitive adhesive polymeric foam layer outer surface and smoother interface (void-free interface) between the pressure sensitive adhesive polymeric foam layer and the heat-activatable adhesive resin layer. The excellent surface and interface properties of the co-extruded multilayer pressure sensitive adhesive assemblies according to the present disclosure result into better wetting on the substrate to adhere to and therefore into improved adhesion properties.

Furthermore, the co-extruded multilayer adhesive assemblies as described herein provide excellent resistance to delamination and outstanding two-bond failure resistance, even at high temperatures such as e.g. 70° C. and even higher. Without wishing to be bound by theory, it is believed that these outstanding properties are due to the excellent anchoring characteristics existing between the heat-activatable adhesive resin layer and the pressure sensitive adhesive polymeric foam layer comprising a rubber-based elastomeric material. Counterintuitively, it has been surprisingly found that these outstanding properties are achieved in the absence of any chemical or physical adhesion-promoting surface treatment performed in none of the heat-activatable adhesive resin layer surface or the surface of the pressure sensitive adhesive foam layer.

As such, the co-extruded multilayer adhesive assemblies according to the present disclosure are more cost-effective in industrial production scale that those known in the art.

In FIG. 1 are illustrated an exemplary co-extruded multilayer adhesive assembly (A) according to one aspect of the present disclosure and an exemplary method of manufacturing an exemplary composite article (B) according to another aspect of the present disclosure. The exemplary co-extruded multilayer adhesive assembly (A) comprises a heat-activatable adhesive resin layer 1 superimposed to a pressure sensitive adhesive polymeric foam layer comprising a rubber-based elastomeric material 2 which is itself superimposed to a second pressure sensitive adhesive layer comprising a rubber-based elastomeric material 3 provided on its outer surface with a release liner 4. The multilayer pressure sensitive adhesive assembly (A) is obtained by a one-step hotmelt co-extrusion of the heat-activatable adhesive resin layer 1, the pressure sensitive adhesive polymeric foam layer 2, and the second pressure sensitive adhesive layer 3. The composite article (B) comprises a rubber seal article 5 which is bonded to the heat-activatable adhesive resin layer 1 according to a conventional heat-lamination step (1*a*).

Figure 2:
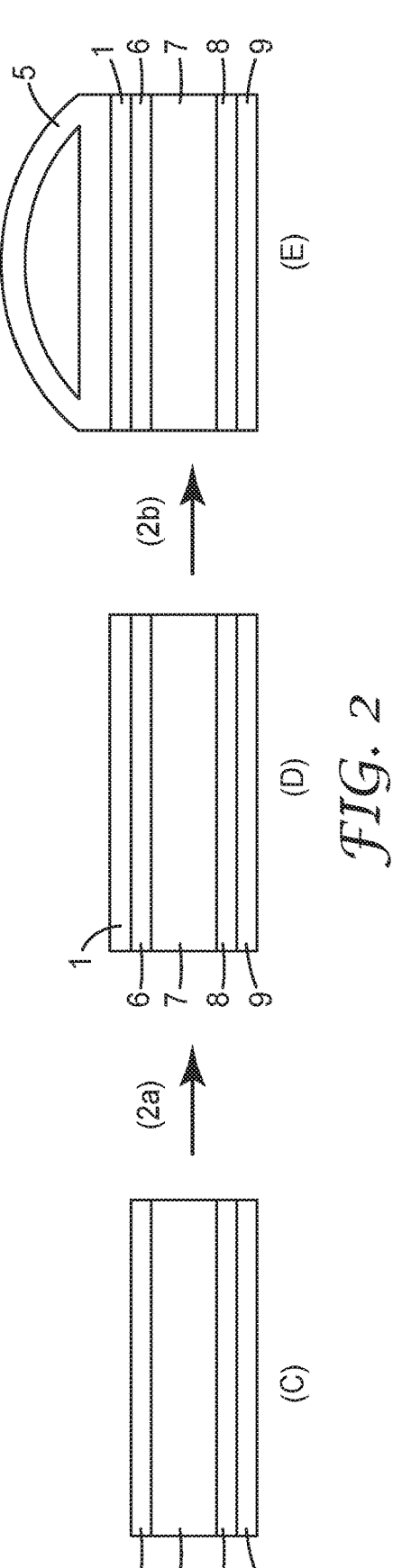
FIG. 2 illustrates a laminated multilayer adhesive assembly as known in the art, and an exemplary method of manufacturing a composite article as known in the art.

In FIG. 2, are illustrated a laminated multilayer pressure sensitive adhesive assembly (D) as known in the art, and an exemplary method of manufacturing a composite article (E) as known in the art. The method of manufacturing a composite article (E) as depicted in FIG. 2 comprises the step of providing a multilayer adhesive assembly (C) which is obtained by a one-step hotmelt co-extrusion of a third pressure sensitive adhesive layer 6, a polymeric foam layer 2 comprising an acrylate-based elastomeric material 7 and a second pressure sensitive adhesive layer comprising an acrylate-based elastomeric material 8. The outer surface of the second pressure sensitive adhesive layer 8 is further provided with a release liner 9. The method further comprises the step (2*a*) of bonding a heat-activatable adhesive resin layer 1 provided on its major surface with an adhesion-promoting primer layer (not represented) onto the third pressure sensitive adhesive layer 6 according to a conventional lamination process. This step results in the laminated multilayer adhesive assembly (D). A rubber seal article 5 is then bonded to the heat-activatable adhesive resin layer 1 according to a conventional heat-lamination step (2*b*), thereby resulting into composite article (E).

As can be seen from FIG. 1 and FIG. 2, the heat activatable multilayer pressure sensitive adhesive assembly (A) is obtained by a one-step co-extrusion process, while the heat activatable multilayer adhesive assembly (D) is obtained a by a first co-extrusion step followed by a lamination step (2*a*) aided by an adhesion-promoting primer layer. Accordingly, the (heat-activatable) co-extruded multilayer adhesive assembly according the present disclosure is advantageously obtained by a one-step process without requiring the additional steps of: a) using an additional pressure sensitive adhesive layer between the pressure sensitive adhesive polymeric foam layer and the heat-activatable adhesive resin layer; b) separately extruding the heat-activatable adhesive resin; c) priming the heat-activatable adhesive resin; and d) laminating the heat-activatable adhesive resin to the multilayer adhesive assembly. This reduced number of manufacturing steps directly translates into substantial production cost savings.

In another advantageous aspect, the co-extruded multilayer adhesive assemblies as described herein are characterized by very low or even substantial absence of perceptible odor. In one particular aspect, the co-extruded multilayer adhesive assemblies according to the present disclosure are characterized by further providing excellent characteristics and performance as to overall fogging levels reduction. The low fogging characteristics typically translate into improved resistance of outgassed components to condensation, as well as improved thermal stability of the corresponding pressure sensitive adhesive.

As such, the co-extruded multilayer adhesive assemblies according to the present disclosure are particularly suited for (industrial) interior applications, more in particular for construction market applications and transportation market applications. In the context of automotive applications, the multilayer adhesive assemblies as described herein may find particular use for taped seal on body, taped seal on door, exterior and interior parts attachment and weather-strip tape applications.

In the context of the present disclosure, the expression "low surface energy substrates" is meant to refer to those substrates having a surface energy of less than 34 dynes per centimeter. Included among such materials are polypropylene, polyethylene (e.g., high density polyethylene or HDPE, low density polyethylene or LDPE, LLDPE), and blends of polypropylene (e.g. PP/EPDM, TPO).

In the context of the present disclosure, the expression "medium surface energy substrates" is meant to refer to those substrates having a surface energy comprised between 34 and 70 dynes per centimeter, typically between 34 and 60 dynes per centimeter, and more typically between 34 and 50 dynes per centimeter. Included among such materials are polyamide 6 (PA6), acrylonitrile butadiene styrene (ABS), PC/ABS blends, PC, PVC, PA, polyurethane, PUR, TPE, POM, polystyrene, poly(methyl methacrylate) (PMMA), clear coat surfaces, in particular clear coats for vehicles like a car or coated surfaces for industrial applications and composite materials like fiber reinforced plastics.

The surface energy is typically determined from contact angle measurements as described, for example, in ASTM D7490-08.

The term "heat-activatable" is conventionally used in the art of adhesive technology and is meant to express that in order to develop adhesion properties, the adhesive needs to be subjected to a heat treatment, typically in a range from about 60° C. to about 200° C.; so as to allow the heat-activatable layer to bond to the desired substrate.

In the context of the present disclosure, the term "chemical or physical adhesion-promoting surface treatment" is meant to refer to any chemical or physical treatment of the surface of a substrate to promote better adhesion of that substrate to another substrate. Typical examples of chemical or physical adhesion-promoting surface treatments include, but are not limited to, chemical cleaning, corona surface pre-treatments, —plasma surface pre-treatments, dielectric barrier surface pre-treatments, flame surface pre-treatments, coating of priming layers, grafted intermediate layers or tie-layers.

Heat-activatable adhesive resins for use herein are not particularly limited. Any heat-activatable adhesive resins commonly known in the art may be used in the context of the present disclosure as long as they comprise a (co)polymer of one or more monomers selected from the group consisting of olefins. Suitable heat-activatable adhesive resins will be easily identified by those skilled in the art in the light of the present disclosure.

According to one advantageous aspect, the heat-activatable adhesive resin for use herein comprises a (co)polymer selected from the group consisting of polyolefin homopolymers, polyolefin/polyolefin copolymers (polyallomers), and any combinations, blends or mixtures thereof.

According to another advantageous aspect, the olefin monomers for use in the heat-activatable adhesive resin are selected from the group consisting of ethylene, propylene, butylene, octylene, and any combinations or mixtures thereof.

According to still another advantageous aspect, the heat-activatable adhesive resin for use herein comprises a (co) polymer selected from the group consisting of polyethylene homopolymer, polypropylene homopolymer, ethylene/propylene copolymers and any combinations, blends or mixtures thereof.

In a more advantageous aspect of the disclosure, the heat-activatable adhesive resin for use herein comprises a (co)polymer selected from the group consisting of ethylene/propylene copolymers and any combinations, blends or mixtures thereof.

In a typical aspect, the heat-activatable adhesive resin for use herein comprises a (co)polymer selected from the group consisting of attactic, isotactic, random, block, impact copolymers, and any combinations, blends or mixtures thereof.

According to one exemplary aspect, the heat-activatable adhesive resin for use herein comprises a propylene-ethylene copolymer having in particular an ethylene content of no greater than 50 wt %, no greater than 40 wt %, no greater than 30 wt %, no greater than 20 wt %, or even no greater than 10 wt %, based on the weight of the heat-activatable adhesive resin.

In one particularly beneficial aspect of the disclosure, the heat-activatable adhesive resin for use herein comprises impact copolymers based on propylene or on polyethylene, in particular impact propylene copolymers comprising and ethylene-propylene elastomeric phase.

Suitable commercially available heat-activatable adhesive resins for use herein include poylpropylene copolymers of the trade name Finapro™, such as those of the trade designation Finapro 5660, Finapro 8780, Finapro 5642, and Finapro 5712 (available from ATOFINA Petrochemichals), ethylene/propylene copolymers of the trade name Eltex P™, such as KS 414, KS 409, or KL 467 (available from Solvay Polymers), those of the trade designation Novolen™ such as MC 3200 (available from Targor GmbH, Ludwigshafen, Germany), or those of the designation PP series (available from ExxonMobil).

The thickness of the heat-activatable adhesive resin layer is determined by the end-use of the co-extruded multilayer adhesive assembly. In a typical aspect, the thickness of the heat-activatable adhesive resin layer is in the range from 30 to 300 micrometers.

According to a typical aspect of the co-extruded multilayer adhesive assembly of the disclosure, the heat-activatable adhesive resin layer for use herein is adhesively bonded to the pressure sensitive adhesive foam layer.

The co-extruded multilayer adhesive assembly of the present disclosure further comprises a pressure sensitive adhesive polymeric foam layer comprising a rubber-based elastomeric material.

In the context of the present disclosure, the term "polymeric foam" is meant to designate a material based on a polymer and which material comprises voids, typically in an amount of at least 5% by volume, typically from 10% to 80% by volume or from 10% to 65% by volume. The voids may be obtained by any of the known methods such as cells formed by gas. Alternatively, the voids may result from the incorporation of hollow fillers, such as hollow polymeric particles, hollow glass microspheres, hollow ceramic microspheres. According to another alternative aspect, the voids may result from the incorporation of heat expandable microspheres, preferably pentane filled expandable microspheres. The heat expandable microspheres for use herein may be expanded when the polymer melt passes an extrusion die. Polymer mixtures containing expandable microspheres may also be extruded at temperatures below their expansion temperature and expanded in a later step by exposing the tape to temperatures above the expansion temperature of the microspheres. Alternatively, the voids can result from the decomposition of chemical blowing agents.

A polymeric foam layer typically has a density comprised between 0.30 $g/cm^3$ and 1.5 $g/cm^3$, between 0.35 $g/cm^3$ and 1.10 $g/cm^3$, or even between 0.40 $g/cm^3$ and 0.95 $g/cm^3$. This density is achieved by including voids or cells. Typically, the polymeric foam layer will comprise at least 5% of voids by volume and for example between 15 and 45%, or between 20% and 45% by volume.

In the context of the present disclosure, the expression "rubber-based elastomeric material" is meant to refer to any non-acrylic based elastomeric material. Included among such materials are natural and synthetic rubbers.

Any commonly known rubber-based elastomeric material may be used in the context of the present disclosure. Suitable rubber-based elastomeric materials for use herein may be easily identified those skilled in the art, in the light of the present disclosure.

According to an exemplary aspect, the rubber-based elastomeric material for use herein is selected from the group consisting of natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

According to a particular aspect, the rubber-based elastomeric material for use herein is selected from the group consisting of synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

In an advantageous aspect of the disclosure, the rubber-based elastomeric material for use herein is selected from the group consisting of halogenated butyl rubbers, in particular bromobutyl rubbers and chlorobutyl rubbers; halogenated isobutylene-isoprene copolymers; bromo-isobutylene-isoprene copolymers; chloro-isobutylene-isoprene copolymers; block copolymers; olefinic block copolymers; butyl rubbers; synthetic polyisoprene; ethylene-octylene rubbers; ethylene-propylene rubbers; ethylene-propylene random copolymers; ethylene-propylene-diene monomer rubbers; polyisobutylenes; poly(alpha-olefin); ethylene-alpha-olefin copolymers; ethylene-alpha-olefin block copolymers; styrenic block copolymers; styrene-isoprene-styrene block copolymers; styrene-butadiene-styrene block copolymers; styrene-ethylene/butadiene-styrene block copolymers; styrene-ethylene/propylene-styrene block copolymers; styrene-butadiene random copolymers; olefinic polymers and copolymers; ethylene-propylene random copolymers; ethylene-propylene-diene terpolymers, and any combinations or mixtures thereof.

According to a preferred aspect, the rubber-based elastomeric material for use herein is selected from the group consisting of olefinic polymers and copolymers, in particular olefinic block copolymers, and any combinations, blends or mixtures thereof.

In a particularly preferred aspect of the disclosure, the rubber-based elastomeric material for use herein comprises (or consists of) a multi-arm block copolymer of the formula $Q_n$-Y, wherein:

i. Q represents an arm of the multi-arm block copolymer and each arm independently has the formula G-R;

ii. n represents the number of arms and is a whole number of at least 3; and iii. Y is the residue of a multifunctional coupling agent;

wherein each R is a rubbery block comprising a polymerized conjugated diene, a hydrogenated derivative of a polymerized conjugated diene, or combinations thereof; and each G is a glassy block comprising a polymerized monovinyl aromatic monomer.

In a typical aspect, a rubbery block exhibits a glass transition temperature (Tg) of less than room temperature. In one aspect, the Tg of the rubbery block is less than about 0° C., or even less than about −10° C. In another aspect, the Tg of the rubbery block is less than about −40° C., or even less than about −60° C.

In a typical aspect, a glassy block exhibits a Tg of greater than room temperature. In some embodiments, the Tg of the glassy block is at least about 40° C., at least about 60° C., at least about 80° C., or even at least about 100° C.

The terms "glass transition temperature" and "Tg" are used interchangeably and refer to the glass transition temperature of a material or a mixture. Unless otherwise indicated, glass transition temperature values are determined by Differential Scanning calorimetry (DSC).

In a particular aspect of the present disclosure, the multi-arm styrenic block copolymer for use herein is such that n ranges from 3 to 10 or even from 3 to 5. In another aspect, n is 4, while in some other executions, n is equal to 6 or more.

Suitable rubbery blocks R for use herein comprise polymerized conjugated dienes, hydrogenated derivatives of a polymerized conjugated diene, or combinations thereof. In a typical aspect, the rubbery block of at least one arm comprises a polymerized conjugated diene selected from the group consisting of isoprene, butadiene, ethylene butadiene copolymers, hydrogenated derivatives of polyisoprene or polybutadiene, and any combinations or mixtures thereof. According to an advantageous aspect, the rubbery blocks of each arm comprise a polymerized conjugated diene selected from the group consisting of isoprene, butadiene, ethylene butadiene copolymers, hydrogenated derivatives of polyisoprene or polybutadiene, and combinations or mixtures thereof.

According to a preferred aspect of the multilayer adhesive assembly according to the present disclosure, at least one of the rubbery blocks of the multi-arm block copolymer comprises a conjugated diene selected from the group consisting of isoprene, butadiene, and any combinations thereof. More preferably, each of the rubbery blocks of the multi-arm block copolymer comprises a conjugated diene selected from the group consisting of isoprene, butadiene, and any combinations thereof.

According to a particularly advantageous aspect of the multilayer adhesive assembly according to the present disclosure, at least one arm of the multi-arm block copolymer is selected from the group consisting of styrene-isoprene-styrene, styrene-butadiene-styrene, styrene-ethylene-butylene-styrene, styrene-ethylene-propylene-styrene, and combinations thereof. More preferably, each arm of the multi-arm block copolymer is selected from the group consisting of styrene-isoprene-styrene, styrene-butadiene-styrene, styrene-ethylene-butylene-styrene, styrene-ethylene-propylene-styrene, and any combinations thereof. Even more preferably, each arm of the multi-arm block copolymer is selected from the group consisting of styrene-isoprene-styrene, styrene-butadiene-styrene, and any combinations thereof.

Suitable glassy blocks G for use herein comprise a polymerized monovinyl aromatic monomer. In a typical aspect, the glassy block of at least one arm comprises a monovinyl aromatic monomer selected from the group consisting of styrene, styrene-compatible blends, and any combinations thereof. According to an advantageous aspect, the glassy blocks of each arm comprise a monovinyl aromatic monomer selected from the group consisting of styrene, styrene-compatible blends, and any combinations thereof.

According to an advantageous execution of the present disclosure, the multi-arm block copolymer for use herein is a (multi-arm) star block copolymer. In a more advantageous aspect of the multilayer adhesive assembly according to the present disclosure, the multi-arm block copolymer is a polymodal block copolymer. As used herein, the term "polymodal" means that the copolymer comprises endblocks having at least two different molecular weights. Such a block copolymer may also be characterized as having at least one "high" molecular weight endblock, and at least one "low" molecular weight endblock, wherein the terms high and low are used relative to each other. In one particular aspect, the ratio of the number average molecular weight of the high molecular weight endblock, $(Mn)H$, relative to the number average molecular weight of the low molecular weight endblock, $(Mn)L$, is at least about 1.25.

In one particular aspect, $(Mn)H$ ranges from about 5000 to about 50000. In another aspect, $(Mn)H$ is at least about 8000, or even at least about 10000. In another aspect, $(Mn)H$ is no greater than about 35000. In still another aspect, $(Mn)L$ ranges from about 1000 to about 10000. In still another aspect, $(Mn)L$ is at least about 2000, or even at least about 4000. In yet another aspect, $(Mn)L$ is less than about 9000, or even less than about 8000.

According to another beneficial aspect, the multi-arm block copolymer is an asymmetric block copolymer. As used herein, the term "asymmetric" means that the arms of the block copolymer are not all identical. Generally, a polymodal block copolymer is an asymmetric block copolymer (i.e., a polymodal asymmetric block copolymer) as not all arms of a polymodal block copolymer are identical since the molecular weights of the end blocks are not all the same. In one aspect, the block copolymers for use in the present disclosure are polymodal, asymmetric block copolymers.

Multi-arm block copolymers for use herein are described e.g. in U.S. Pat. No. 7,163,741 B1 (Khandpur et al.). Methods of making multi-arm block copolymers, in particular polymodal asymmetric, block copolymers are described in, e.g., U.S. Pat. No. 5,296,547 (Nestegard et al.), or in U.S. Pat. No. 5,393,787 (Nestegard et al.), the content of which is herewith incorporated by reference.

Generally, the multifunctional coupling agent for use herein may be any polyalkenyl coupling agent or other material known to have functional groups that can react with carbanions of the living polymer to form linked polymers. The polyalkenyl coupling agent may be aliphatic, aromatic, or heterocyclic. Exemplary aliphatic polyalkenyl coupling agents include, but are not limited to, polyvinyl and polyalkyl acetylenes, diacetylenes, phosphates, phosphites, and dimethacrylates (e.g., ethylene dimethacrylate). Exemplary aromatic polyalkenyl coupling agents include but are not limited to, polyvinyl benzene, polyvinyl toluene, polyvinyl xylene, polyvinyl anthracene, polyvinyl naphthalene, and divinyldurene. Exemplary polyvinyl groups include, but are not limited to, divinyl, trivinyl, and tetravinyl groups. In one aspect, divinylbenzene (DVB) may be used, and may include o-divinyl benzene, m-divinyl benzene, p-divinyl benzene, and mixtures thereof. Exemplary heterocyclic polyalkenyl coupling agents include, but are not limited to, divinyl pyridine, and divinyl thiophene. Other exemplary multifunctional coupling agents include, but are not limited to, silicon halides, polyepoxides, polyisocyanates, polyke-
tones, polyanhydrides, and dicarboxylic acid esters.

According to a typical aspect, the rubber-based elasto-
meric material as described above is used for example in
amounts of up to 80 wt %, based on the weight of the
pressure sensitive adhesive polymeric foam. In one exem-
plary aspect, the amount of rubber-based elastomeric mate-
rial is in the range from 20 wt % to 80 wt %, from 20 wt %
to 70 wt %, from 25 wt % to 60 wt %, from 30 wt % to 60
wt %, or even from 35 wt % to 60 wt %, based on the weight
of the pressure sensitive adhesive polymeric foam.

In one particular aspect of the co-extruded multilayer
adhesive assembly, the pressure sensitive adhesive poly-
meric foam layer may optionally further comprise a hydro-
carbon tackifier. Suitable hydrocarbon tackifiers for use
herein are not particularly limited.

Any hydrocarbon tackifiers typically included in conven-
tional pressure-sensitive adhesive compositions may be used
in the context of the present disclosure. Useful hydrocarbon
tackifiers are typically selected to be miscible with the
(co)polymeric material. Suitable hydrocarbon tackifier(s)
for use herein may be easily identified by those skilled in the
art, in the light of the present disclosure.

Either solid or liquid hydrocarbon tackifiers may be
added, although solid hydrocarbon tackifiers are preferred.
Solid tackifiers generally have a number average molecular
weight (Mw) of 10,000 grams per mole or less and a
softening point above about 70° C. Liquid tackifiers are
viscous materials that have a softening point of about 0° C.
to about 20° C.

Suitable tackifying resins may include terpene resins such
as polyterpenes (e.g., alpha pinene-based resins, beta
pinene-based resins, and limonene-based resins) and aro-
matic-modified polyterpene resins (e.g., phenol modified
polyterpene resins); coumarone-indene resins; and petro-
leum-based hydrocarbon resins such as C5-based hydrocar-
bon resins, C9-based hydrocarbon resins, C5/C9-based
hydrocarbon resins, and dicyclopentadiene-based resins.
These tackifying resins, if added, can be hydrogenated to
lower their color contribution to the particular pressure-
sensitive adhesive composition. Combinations of various
tackifiers can be used if desired, as long as they fulfill the
above-detailed VOC requirements and preferably the above-
detailed FOG level requirements too.

Tackifiers that are hydrocarbon resins can be prepared
from various petroleum-based feed stocks. There feedstocks
can be aliphatic hydrocarbons (mainly C5 monomers with
some other monomers present such as a mixture of trans-1,
3-pentadiene, cis-1,3-pentadiene, 2-methyl-2-butene, dicy-
clopentadiene, cyclopentadiene, and cyclopentene), aro-
matic hydrocarbons (mainly C9 monomers with some other
monomers present such as a mixture of vinyl toluenes,
dicyclopentadiene, indene, methylstyrene, styrene, and
methylindenes), or mixtures thereof. Tackifiers derived from
C5 monomers are referred to as C5-based hydrocarbon
resins while those derived from C9 monomers are referred
to as C9-based hydrocarbon resins. Some tackifiers are
derived from a mixture of C5 and C9 monomers or are a
blend of C5-based hydrocarbon tackifiers and C9-based
hydrocarbon tackifiers. These tackifiers can be referred to as
C5/C9-based hydrocarbon tackifiers. Any of these resins can
be partially or fully hydrogenated to improve their color,
their thermal stability or their process compatibility.

The C5-based hydrocarbon resins are commercially avail-
able from Eastman Chemical Company under the trade
designations PICCOTAC and EASTOTAC, from Cray Val-
ley under the trade designation WINGTACK, from Neville Chemical Company under the trade designation NEVTAC
LX, and from Kolon Industries, Inc. under the trade desig-
nation HIKOREZ. The C5-based hydrocarbon resins are
commercially available from Eastman Chemical with vari-
ous degrees of hydrogenation under the trade designation
EASTOTACK.

The C9-based hydrocarbon resins are commercially avail-
able from Eastman Chemical Company under the trade
designation PICCO, KRISTLEX, PLASTOLYN, and PIC-
COTAC, and ENDEX, from Cray Valley under the trade
designations NORSOLENE, from Ruetgers N.V. under the
trade designation NOVAREZ, and from Kolon Industries,
Inc. under the trade designation HIKOTAC. These resins can
be partially or fully hydrogenated. Prior to hydrogenation,
the C9-based hydrocarbon resins are often about 40 percent
aromatic as measured by proton Nuclear Magnetic Reso-
nance. Hydrogenated C9-based hydrocarbon resins are com-
mercially available, for example, from Eastman Chemical
under the trade designations REGALITE and REGALREZ
that are 50 to 100 percent (e.g., 50 percent, 70 percent, 90
percent, and 100 percent) hydrogenated. The partially
hydrogenated resins typically have some aromatic rings.

Various C5/C9-based hydrocarbon tackifiers are commer-
cially available from Arakawa under the trade designation
ARKON, from Zeon under the trade designation QUIN-
TONE, from Exxon Mobil Chemical under the trade desig-
nation ESCOREZ, and from Newport Industries under the
trade designations NURES and H-REZ (Newport Indus-
tries). In the context of the present disclosure, suitable
hydrocarbon tackifiers for use herein may be advantageously
selected among those C5/C9-based hydrocarbon tackifiers
commercially available from Exxon Mobil Chemical under
the trade designation ESCOREZ.

According to a preferred aspect of the multilayer pressure
sensitive adhesive assembly of the present disclosure, the
hydrocarbon tackifier for use herein is selected from the
group consisting of aliphatic hydrocarbon resins, cycloali-
phatic hydrocarbon resins, aromatic modified aliphatic and
cycloaliphatic resins, aromatic resins, hydrogenated hydro-
carbon resins, terpene and modified terpene resins, terpene-
phenol resins, rosin esters, and any combinations or mix-
tures thereof.

In an advantageous aspect of the present disclosure, the
tackifying resin is selected from the group consisting of
C5-based hydrocarbon resins, C9-based hydrocarbon resins,
C5/C9-based hydrocarbon resins, and any combinations or
mixtures thereof. In another advantageous aspect, the tacki-
fying resin is selected from the group consisting of hydro-
genated terpene resins, hydrogenated rosin resins, hydroge-
nated C5-based hydrocarbon resins, hydrogenated C9-based
hydrocarbon resins, hydrogenated C5/C9-based hydrocar-
bon resins, and any combinations or mixtures thereof.

In one beneficial aspect of the co-extruded multilayer
adhesive assembly according to the present disclosure, the
hydrocarbon tackifier(s) for use herein have a Volatile
Organic Compound (VOC) value of less than 1000 ppm, less
than 800 ppm, less than 600 ppm, less than 400 ppm or even
less than 200 ppm, when measured by thermogravimetric
analysis according to the weight loss test method described
in the experimental section.

According to another beneficial aspect, the hydrocarbon
tackifier(s) for use herein have a Volatile Fogging Com-
pound (FOG) value of less than 1500 ppm, less than 1000
ppm, less than 800 ppm, less than 600 ppm, or even less than
500 ppm, when measured by thermogravimetric analysis
according to the weight loss test methods described in the
experimental section.

Advantageously, the hydrocarbon tackifier(s) for use herein have an outgassing value of less than 1 wt %, less than 0.8 wt %, less than 0.6 wt %, less than 0.5 wt %, less than 0.4 wt %, less than 0.3 wt %, less than 0.2 wt % or even less than 0.1 wt %, when measured by weight loss analysis according to the oven outgassing test method described in the experimental section.

According to an advantageous aspect, the pressure sensitive adhesive polymeric foam layer for use herein comprises a first hydrocarbon tackifier having a Volatile Organic Compound (VOC) value of less than 1000 ppm, when measured by thermogravimetric analysis according to the weight loss test methods described in the experimental section, wherein the first hydrocarbon tackifier has preferably a Tg of at least 60° C., and wherein preferably the first hydrocarbon tackifier is primarily compatible with the rubbery blocks.

In an advantageous aspect, the first hydrocarbon tackifier is primarily compatible with at least some of the rubbery blocks. In another advantageous aspect, the first hydrocarbon tackifier is primarily compatible with each rubbery block of a multi-arm block copolymer.

As used herein, a tackifier is "compatible" with a block if it is miscible with that block. Generally, the miscibility of a tackifier with a block can be determined by measuring the effect of the tackifier on the Tg of that block. If a tackifier is miscible with a block, it will alter (e.g., increase) the Tg of that block. A tackifier is "primarily compatible" with a block if it is at least miscible with that block, although it may also be miscible with other blocks. For example, a tackifier that is primarily compatible with a rubbery block will be miscible with the rubbery block but may also be miscible with a glassy block.

Generally, resins having relatively low solubility parameters tend to associate with the rubbery blocks; however, their solubility in the glassy blocks tends to increase as the molecular weights or softening points of these resins are lowered.

Exemplary first hydrocarbon tackifiers that are primarily compatible with the rubbery blocks are advantageously selected from the group consisting of polymeric terpenes, hetero-functional terpenes, coumarone-indene resins, rosin acids, esters of rosin acids, disproportionated rosin acid esters, hydrogenated, C5 aliphatic resins, C9 hydrogenated aromatic resins, C5/C9 aliphatic/aromatic resins, dicyclopentadiene resins, hydrogenated hydrocarbon resins arising from C5/C9 and dicyclopentadiene precursors, hydrogenated styrene monomer resins, and any blends thereof.

According to another advantageous aspect, the pressure sensitive adhesive polymeric foam for use herein may optionally comprise a second hydrocarbon tackifier having a Volatile Organic Compound (VOC) value of less than 1000 ppm, when measured by thermogravimetric analysis according to the weight loss test methods described in the experimental section, wherein the second hydrocarbon tackifier has preferably a Tg of at least 60° C., and wherein preferably the second hydrocarbon tackifier is primarily compatible with the glassy blocks.

In a preferred aspect, the second hydrocarbon tackifiers that are primarily compatible with the glassy blocks are advantageously selected from the group consisting of coumarone-indene resins, rosin acids, esters of rosin acids, disproportionated rosin acid esters, C9 aromatics, styrene, alpha-methyl styrene, pure monomer resins and C9/C5 aromatic-modified aliphatic hydrocarbons, and blends thereof.

In one aspect of the pressure sensitive adhesive polymeric foam for use herein, the first and/or the second hydrocarbon tackifier has a Tg of at least 65° C., or even at least 70° C. In another aspect, both the first and the second hydrocarbon tackifier have a Tg of at least 65° C., or even at least 70° C.

In another aspect of the pressure sensitive adhesive polymeric foam for use herein, the first and/or the second hydrocarbon tackifier has a softening point of at least about 115° C., or even at least about 120° C. In still another aspect, both the first and the second hydrocarbon tackifier have a softening point of at least about 115° C., or even at least about 120° C.

According to a typical aspect of the pressure sensitive adhesive polymeric foam for use in the present disclosure, the ratio of the total weight of all block copolymers to the total weight of all hydrocarbon tackifiers ranges from 2.4:1 to 1:2.4, from 2:1 to 1:2, from 1.5:1 to 1:1.5, from 1.2:1 to 1:1.2, from 1.15:1 to 1:1.15, or even from 1.1:1 to 1:1.1.

According to a typical aspect of the pressure sensitive adhesive polymeric foam, any of the hydrocarbon tackifiers may be used for example in amounts of up to 80 wt %, based on the weight of the pressure sensitive adhesive polymeric foam. In one aspect, the tackifiers can be used in amounts up to 70 wt %, up to 60 wt %, up to 55 wt %, up to 50 wt %, or even up to 45 wt %, based on the weight of the pressure sensitive adhesive polymeric foam. The amount of tackifiers can be for example, in the range from 20 wt % to 70 wt %, from 25 wt % to 60 wt %, or even from 25 wt % to 50 wt %, based on the weight of the pressure sensitive adhesive polymeric foam.

In one particular aspect of the co-extruded multilayer adhesive assembly, the pressure sensitive adhesive polymeric foam layer may optionally further comprise a polymeric plasticizer. Suitable polymeric plasticizers for use herein are not particularly limited.

Any polymeric plasticizers typically included in conventional pressure-sensitive adhesive compositions may be used in the context of the present disclosure. Suitable polymeric plasticizers for use herein may be easily identified by those skilled in the art, in the light of the present disclosure.

In a typical aspect, the polymeric plasticizer for use herein has a weight average molecular weight $M_w$ of at least 10.000 g/mol, at least 15.000 g/mol, at least 20.000 g/mol, or even at least 30.000 g/mol.

The weight average molecular weight Mw of the polymeric plasticizer may be determined by any methods known to the skilled person, for example Gel Permeation Chromatography (GPC) also known as Size Exclusion Chromatography (SEC) or by light scattering techniques. Unless otherwise stated, the weight average molecular weight Mw of the polymeric plasticizers is measured by light scattering according to ASTM D4001-13.

In another typical aspect, the polymeric plasticizer for use herein has a weight average molecular weight $M_w$ of 100.000 g/mol or less, less than 90.000 g/mol, less than 80.000 g/mol, less than 70.000 g/mol, less than 60.000 g/mol, less than 50.000 g/mol, or even less than 40.000 g/mol.

In still another aspect, the polymeric plasticizer for use herein has a weight average molecular weight $M_w$ in a range from 10.000 to 80.000 g/mol, from 20.000 to 70.000 g/mol, from 25.000 to 65.000 g/mol, from 25.000 to 60.000 g/mol, from 30.000 to 60.000 g/mol, or even from 30.000 to 55.000 g/mol.

According to an advantageous aspect, the polymeric plasticizer for use is selected from the group consisting of polyisobutylene plasticizers, liquid polybutadiene plasticizers, liquid polyisoprene plasticizers, liquid isoprene-butadiene-styrene copolymers plasticizers, ethylene propylene diene monomer plasticizers, liquid hydrocarbon resins, and any combinations or mixtures or hydrogenated versions thereof.

Advantageously, the polymeric plasticizer(s) for use herein, have a Volatile Organic Compound (VOC) value of less than 1000 ppm, less than 800 ppm, less than 600 ppm, less than 400 ppm or even less than 200 ppm, when measured by thermogravimetric analysis according to the weight loss test method described in the experimental section.

Advantageously still, the polymeric plasticizer(s) for use herein, have a Volatile Fogging Compound (FOG) value of less than 2500 ppm, less than 2000 ppm, less than 1500 ppm, less than 1000 ppm, less than 800 ppm, less than 600 ppm, or even less than 500 ppm, when measured by thermogravimetric analysis according to the weight loss test method described in the experimental section.

Yet advantageously still, the polymeric plasticizer(s) for use herein, have an outgassing value of less than 1 wt %, less than 0.8 wt %, less than 0.6 wt %, less than 0.5 wt %, less than 0.4 wt %, less than 0.3 wt %, less than 0.2 wt % or even less than 0.1 wt %, when measured by weight loss analysis according to the oven outgassing test method described in the experimental section.

According to a particularly preferred execution of the pressure sensitive adhesive polymeric foam for use in the present disclosure, the polymeric plasticizer is a polyisobutylene plasticizer. Typical examples of polyisobutylene plasticizers that can be used herein include, but are not limited to, those selected among those commercially available from BASF under the trade designation OPPANOL, in particular OPPANOL B series.

According to a typical aspect, the polymeric plasticizers are used for example in amounts of up to 40 wt %, based on the weight of the pressure sensitive adhesive polymeric foam.

In another aspect, the polymeric plasticizers may be used in amounts up to 35 wt %, up to 30 wt %, or up to 25 wt %, based on the weight of the pressure sensitive adhesive polymeric foam. The amount of polymeric plasticizer can be for example, in the range from 1 wt % to 40 wt %, from 2 wt % to 30 wt %, from 5 wt % to 30 wt %, or even from 10 wt % to 25 wt %, based on the weight of the pressure sensitive adhesive polymeric foam.

According to another typical aspect of the co-extruded multilayer adhesive assembly, the pressure sensitive adhesive polymeric foam may further comprise, as an optional ingredient, a filler material, in particular a particulate filler material.

Any filler material commonly known to those skilled in the art may be used in the context of the present disclosure. Typical examples of filler material that can be used herein include, but are not limited to, those selected from the group consisting of expanded perlite, microspheres, expandable microspheres, ceramic spheres, zeolites, clay fillers, glass beads, hollow inorganic beads, silica type fillers, hydrophobic silica type fillers, hydrophilic silica type fillers, fumed silica, fibers, in particular glass fibers, carbon fibers, graphite fibers, silica fibers, ceramic fibers, electrically and/or thermally conducting particles, nanoparticles, in particular silica nanoparticles, and any combinations thereof.

In a typical aspect of the present disclosure, the pressure sensitive adhesive polymeric foam further comprises a particulate filler material which is preferably selected from the group consisting of microspheres, expandable microspheres, preferably pentane filled expandable microspheres, gaseous cavities, glass beads, glass microspheres, glass bubbles and any combinations or mixtures thereof. More typically, the pressure sensitive adhesive polymeric foam comprises a particulate filler material selected from the group consisting of expandable microspheres, glass bubbles, and any combinations or mixtures thereof.

When present, the filler material for use herein may be used in the pressure sensitive adhesive polymeric foam, in any suitable amounts. In one exemplary aspect, the filler material is present in amounts up to 30 wt %, up to 25 wt %, or even up to 20 wt %, based on weight of the pressure sensitive adhesive polymeric foam. In another exemplary aspect, this amount is typically of at least 1 wt %, or at least 3 wt %, based on the weight of the pressure sensitive adhesive polymeric foam.

According to a further exemplary aspect, the filler material is present in an amount ranging from 2 wt % to 30 wt %, from 2 wt % to 20 wt %, or even from 2 wt % to 15 wt %, based on the weight of the pressure sensitive adhesive polymeric foam.

In a typical aspect of the co-extruded multilayer adhesive assembly, the pressure sensitive adhesive polymeric foam layer for use herein is free of poly(meth)acrylates.

According to an advantageous aspect of the co-extruded multilayer adhesive assembly, the pressure sensitive adhesive polymeric foam layer for use herein comprises:
  a) from 20 wt % to 80 wt %, from 20 wt % to 70 wt %, from 25 wt % to 60 wt %, from 30 wt % to 60 wt %, or even from 35 wt % to 60 wt % of the rubber-based elastomeric material, based on the total weight of the pressure sensitive adhesive polymeric foam;
  b) optionally, from 20 wt % to 70 wt %, from 25 wt % to 60 wt %, or even from 25 wt % to 50 wt % of the hydrocarbon tackifier, based on the total weight of the pressure sensitive adhesive polymeric foam;
  c) optionally, from 1 wt % to 40 wt %, from 2 wt % to 30 wt %, from 5 wt % to 30 wt %, or even from 10 wt % to 25 wt % of the polymeric plasticizer, in particular a polyisobutylene plasticizer, based on the total weight of the pressure sensitive adhesive polymeric foam; and
  d) optionally, from 2 wt % to 30 wt %, from 2 wt % to 20 wt %, or even from 2 wt % to 15 wt % of the particulate filler material preferably selected from the group of expandable microspheres and glass bubbles, based on the weight of the pressure sensitive adhesive polymeric foam.

According to another advantageous aspect of the co-extruded multilayer adhesive assembly, the pressure sensitive adhesive polymeric foam layer for use herein is free of any crosslinking additive, in particular free of multifunctional (meth)acrylate compounds.

In one particular aspect, the pressure sensitive adhesive polymeric foam layer further comprises a crosslinking additive (also referred to as crosslinking agent). Suitable crosslinking additives for use herein are not particularly limited and may be easily identified by those skilled in the art, in the light of the present disclosure.

Suitable crosslinking additives for use herein include, but are not limited to, multifunctional (meth)acrylates and multifunctional maleimide compounds. Particularly suitable crosslinking additives for use herein comprise multiple (meth)acryloyl groups.

Crosslinkers with multiple (meth)acryloyl groups can be di(meth)acrylates, tri(meth)acrylates, tetra(meth)acrylates, penta(meth)acrylates, and the like. These crosslinkers can be formed, for example, by reacting (meth)acrylic acid with a polyhydric alcohol (i.e., an alcohol having at least two hydroxyl groups). The polyhydric alcohol often has two, three, four, or five hydroxyl groups. Mixtures of crosslinkers may also be used.

In one aspect, the crosslinkers contain at least two (meth) acryloyl groups. Exemplary crosslinkers with two acryloyl groups include, but are not limited to, 1,2-ethanediol diacrylate, 1,3-propanediol diacrylate, 1,9-nonanediol diacrylate, 1,12-dodecanediol diacrylate, 1,4-butanediol diacrylate, 1,6-hexanediol diacrylate, butylene glycol diacrylate, bisphenol A diacrylate, diethylene glycol diacrylate, triethylene glycol diacrylate, tetraethylene glycol diacrylate, tripropylene glycol diacrylate, polyethylene glycol diacrylate, polypropylene glycol diacrylate, polyethylene/polypropylene copolymer diacrylate, polybutadiene di(meth)acrylate, propoxylated glycerin tri(meth)acrylate, and neopentylglycol hydroxypivalate diacrylate modified caprolactone.

Exemplary crosslinkers with three or four (meth)acryloyl groups include, but are not limited to, trimethylolpropane triacrylate (e.g., commercially available under the trade designation TMPTA-N from Cytec Industries, Inc., Smyrna, GA and under the trade designation SR-351 from Sartomer, Exton, PA), trimethylolpropane trimethacrylate (e.g., commercially available under the trade designation SR-350 from Sartomer, Exton, PA), pentaerythritol triacrylate (e.g., commercially available under the trade designation SR-444 from Sartomer), tris(2-hydroxyethylisocyanurate) triacrylate (e.g., commercially available under the trade designation SR-368 from Sartomer), a mixture of pentaerythritol triacrylate and pentaerythritol tetraacrylate (e.g., commercially available from Cytec Industries, Inc., under the trade designation PETIA with an approximately 1:1 ratio of tetraacrylate to triacrylate and under the trade designation PETA-K with an approximately 3:1 ratio of tetraacrylate to triacrylate), pentaerythritol tetraacrylate (e.g., commercially available under the trade designation SR-295 from Sartomer), di-trimethylolpropane tetraacrylate (e.g., commercially available under the trade designation SR-355 from Sartomer), and ethoxylated pentaerythritol tetraacrylate (e.g., commercially available under the trade designation SR-494 from Sartomer). An exemplary crosslinker with five (meth) acryloyl groups includes, but is not limited to, dipentaerythritol pentaacrylate (e.g., commercially available under the trade designation SR-399 from Sartomer).

In one particular aspect, the crosslinkers are polymeric materials that contains at least two (meth)acryloyl groups. For example, the crosslinkers can be poly(alkylene oxides) with at least two acryloyl groups (e.g., polyethylene glycol diacrylates commercially available from Sartomer such as SR210, SR252, and SR603) or poly(urethanes) with at least two (meth)acryloyl groups (e.g., polyurethane diacrylates such as CN9018 from Sartomer). As the higher molecular weight of the crosslinkers increases, the resulting acrylic copolymer tends to have a higher elongation before breaking. Polymeric crosslinkers tend to be used in greater weight percent amounts compared to their non-polymeric counterparts.

In still other methods of crosslinking, thermal crosslinkers may be used, optionally in combination with suitable accelerants and retardants. Suitable thermal crosslinkers for use herein include, but are not limited to, isocyanates, more particularly trimerized isocyanates and/or sterically hindered isocyanates that are free of blocking agents, or else epoxide compounds such as epoxide-amine crosslinker systems. Advantageous crosslinker systems and methods are described e.g. in the descriptions of DE202009013255 U1, EP 2 305 389 A1, EP 2 414 143 A1, EP 2 192 148 A1, EP 2 186 869, EP 0 752 435 A1, EP 1 802 722 A1, EP 1 791 921 A1, EP 1 791 922 A1, EP 1 978 069 A1, and DE 10 2008 059 050 A1, the relevant contents of which are herewith incorporated by reference. Particularly advantageous crosslinker systems and methods are described in EP 0 752 435 A1 and EP 1 978 069 A1. Suitable accelerants and retardant systems for use herein are described e.g. in the description of US-A1-2011/0281964, the relevant content of which is herewith explicitly incorporated by reference. Suitable thermal crosslinkers for use herein include epoxycyclohexyl derivatives, in particular epoxycyclohexyl carboxylate derivatives, with particular preference to (3,4-epoxycyclohexane)methyl 3,4-epoxycyclohexylcarboxylate, commercially available from Cytec Industries Inc. under tradename UVACURE 1500. According to a particular aspect, the rubber-based elastomeric material for use herein may comprise (co)polymers or copolymers crosslinkable with epoxide groups. Correspondingly, at least part of the monomers or comonomers used may advantageously be functional monomers crosslinkable with epoxide groups. Monomers with acid groups (especially carboxylic, sulphonic or phosphonic acid groups) and/or hydroxyl groups and/or acid anhydride groups and/or epoxide groups and/or amine groups, in particular monomers containing carboxylic acid groups, may be suitably used. Suitable functional monomers are described e.g. in US 2005/0288436 A1.

The crosslinking additive, if present, may be used for example in amounts of up to 40 wt %, based on the weight of the pressure sensitive adhesive polymeric foam. In one particular aspect, the crosslinking additive may be used in amounts ranging from 0.1 wt % to 10 wt %, from 0.5 wt % to 8 wt %, from 1 wt % to 6 wt %, or even from 2 wt % to 5 wt %, based on the weight of the pressure sensitive adhesive polymeric foam.

Aside from thermal, moisture or photosensitive crosslinking additives, crosslinking may also be achieved using high energy electromagnetic radiation, such as gamma or e-beam radiation.

In an advantageous aspect of the present disclosure, the crosslinking additive for use herein is activated/activatable with actinic radiation, more preferably with e-beam irradiation. In a more preferred aspect, the crosslinking additive is selected from the group of multifunctional (meth)acrylate compounds. Exemplary multifunctional (meth)acrylate compounds preferably comprise at least two (meth)acryloyl groups, in particular three or four (meth)acryloyl groups, more in particular three (meth)acryloyl groups.

In another advantageous aspect, the multifunctional (meth)acrylate compound has the following Formula:

$$H_2C=C(R^1)-(CO)-O-R^2-[O-(CO)-(R^1)$$
$$C=CH_2]n$$

wherein $R^1$ is hydrogen or methyl; n is 1, 2, 3 or 4; and $R^2$ is an alkylene, arylene, heteroalkylene, or any combinations thereof.

According to still another advantageous aspect, the crosslinking additive for use herein is a multifunctional (meth) acrylate compound selected from the group consisting of 1,6-hexanediol di(meth)acrylate, trimethylolpropane tri (meth)acrylate, and any combinations or mixtures thereof.

As will be apparent to those skilled in the art in the light of the present disclosure, other additives may optionally be included in the pressure sensitive adhesive polymeric foam to achieve any desired properties. Such additives include, but are not limited to, further tackifiers, pigments, toughening agents, reinforcing agents, fire retardants, antioxidants, polymerization initiators, and various stabilizers. The additives are typically added in amounts sufficient to obtain the desired end properties.

In one typical aspect of the disclosure, the co-extruded multilayer adhesive assembly is in the form of a two-layer co-extruded multilayer adhesive construction comprising the heat-activatable adhesive resin layer and the pressure sensitive adhesive polymeric foam layer.

The thickness of the heat-activatable adhesive resin layer is determined by the end-use of the co-extruded multilayer adhesive assembly. In a typical aspect, the thickness of the heat-activatable adhesive resin layer is in the range from 30 to 300 micrometers. According to another typical, the pressure sensitive adhesive polymeric foam layer has a thickness in a range from 100 to 6000 micrometers, from 400 to 3000 micrometers, or even from 800 to 2000 micrometers.

The co-extruded multilayer adhesive assembly according to the present disclosure may have a design or configuration of any suitable kind, depending on its ultimate application and the desired properties, and provided it comprises at least a co-extruded heat-activatable adhesive resin layer and a co-extruded pressure sensitive adhesive polymeric foam layer as described above.

According to an exemplary aspect, the co-extruded multilayer adhesive assembly of the present disclosure may take the form of a multilayer construction comprising two or more superimposed layers, i.e. the heat-activatable adhesive resin layer, the pressure sensitive adhesive polymeric foam layer and optionally, adjacent layers such as e.g. further pressure sensitive adhesive layers and/or a backing layer. Such adhesive multilayer constructions or tapes may be advantageously used as a dual-layer adhesive tape to adhere two objects to one another. In that context, suitable layers or backing layers for use herein may or may not exhibit at least partial pressure sensitive adhesive characteristics.

Accordingly, in an advantageous aspect of the present disclosure, the pressure sensitive adhesive polymeric foam layer has a first major surface and a second major surface, the heat-activatable adhesive resin layer is in direct contact with (bonded to) the first major surface of the pressure sensitive adhesive polymeric foam layer, and the multilayer pressure sensitive adhesive assembly further comprises a second pressure sensitive adhesive layer bonded to the second major surface of the pressure sensitive adhesive polymeric foam layer.

According to this advantageous execution, the multilayer adhesive assembly is advantageously obtained by hotmelt co-extrusion of the pressure sensitive polymeric foam layer, the heat-activatable adhesive resin layer and the second pressure sensitive adhesive layer, wherein the second pressure sensitive adhesive layer is preferably in direct contact with the second major surface of the pressure sensitive adhesive polymeric foam layer, and wherein the second major surface of the pressure sensitive adhesive polymeric foam layer and the surface of the second pressure sensitive adhesive layer which is in direct contact with the second major surface pressure sensitive adhesive polymeric foam layer are preferably free of any chemical or physical adhesion-promoting surface treatment.

According to an advantageous aspect of the multilayer pressure sensitive adhesive assembly, the second pressure sensitive adhesive layer for use herein has a thickness of less than 1500 micrometers, less than 1000 micrometers, less than 800 micrometers, less than 600 micrometers, less than 400 micrometers, less than 200 micrometers, less than 150 micrometers, or even less than 100 micrometers. Advantageously still, the second pressure sensitive adhesive layer for use herein has a thickness comprised in a range from 20 to 1500 micrometers, from 20 to 1000 micrometers, from 20 to 500 micrometers, from 30 to 400 micrometers, from 30 to 250 micrometers, from 40 to 200 micrometers, or even from 50 to 150 micrometers.

The thickness of the various layer(s) and other optional layer(s) comprised in the co-extruded multilayer adhesive assembly may vary in wide ranges depending on the desired execution and associated properties. By way of example, the thickness can be independently chosen for each layer in a range from 25 to 6000 micrometers, from 40 to 3000 micrometers, from 50 to 3000 micrometers, from 50 to 2000 micrometers, or even from 50 to 1500 micrometers.

According to the particular execution wherein the co-extruded multilayer adhesive assembly takes the form of skin/core type co-extruded multilayer adhesive assembly, wherein the pressure sensitive polymeric foam layer is the core layer of the multilayer adhesive assembly and the heat-activatable adhesive resin layer is the skin layer of the multilayer adhesive assembly, it is preferred that the heat-activatable adhesive resin layer has a lower thickness compared to the pressure sensitive polymeric foam/core layer.

In the particular execution according to which the co-extruded multilayer adhesive assembly further comprises a second pressure sensitive adhesive skin layer bonded to the second major surface of the pressure sensitive adhesive polymeric foam layer, such a multilayer adhesive assembly reflects a three-layer design, in which the pressure sensitive adhesive polymeric foam layer is sandwiched between the heat-activatable adhesive resin layer and the second pressure sensitive adhesive (skin) layer. This particular multilayer adhesive assembly may advantageously take the form of a skin/core/skin multilayer assembly, wherein the pressure sensitive adhesive polymeric foam layer is the core layer of the multilayer adhesive assembly, and the skin layers are the heat-activatable adhesive resin layer and the second pressure sensitive adhesive layer.

In one particular aspect of the multilayer adhesive assembly, the pressure sensitive adhesive polymeric foam layer and the second pressure sensitive adhesive layer have the same pressure sensitive adhesive composition and comprise a pressure sensitive adhesive composition as described above. In an alternative aspect, the pressure sensitive adhesive polymeric foam layer and the second pressure sensitive adhesive layer have a dissimilar pressure sensitive adhesive composition.

Suitable compositions for forming the second pressure sensitive adhesive layer for use herein are not particularly limited and may be easily identified by those skilled in the art, in the light of the present disclosure.

According to an exemplary aspect of the co-extruded multilayer adhesive assembly, the second pressure sensitive adhesive layer comprises a polymer base material selected from the group consisting of rubber-based elastomeric materials, polyacrylates, polyurethanes, polyolefins, polyamides, polyesters, polyethers, polyisobutylene, polystyrenes, polyvinyls, polyvinylpyrrolidone, silicones, and any combinations, copolymers or mixtures thereof.

In an advantageous aspect, the second pressure sensitive adhesive layer comprises a polymer base material selected from the group consisting of rubber-based elastomeric materials. More advantageously, the second pressure sensitive adhesive layer has a composition as described above in the context of the pressure sensitive adhesive polymeric foam layer.

According to another advantageous aspect of the co-extruded multilayer adhesive assembly, the second pressure sensitive adhesive layer further comprises a linear block copolymer of the formula L-(G)$_m$, wherein L is a rubbery block comprising a polymerized olefin, a polymerized conjugated diene, a hydrogenated derivative of a polymerized conjugated diene, or any combinations thereof; wherein each G is a glassy block comprising a polymerized monovinyl aromatic monomer; and wherein m is 1 or 2. Suitable rubbery blocks L for use herein comprise a polymerized olefin, a polymerized conjugated diene, a hydrogenated derivative of a polymerized conjugated diene, or any combinations thereof, and m is advantageously 1 or 2.

In one particular aspect, m is 1, and the linear block copolymer is a diblock copolymer comprising one rubbery block L and one glassy block G. In another particular aspect, m is 2, and the linear block copolymer comprises two glassy endblocks and one rubbery midblock, i.e., the linear block copolymer is a triblock copolymer.

In still another particular aspect, the rubbery block L comprises a polymerized conjugated diene, a hydrogenated derivative of a polymerized conjugated diene, or any combinations thereof. In yet another particular aspect, the conjugated dienes comprise 4 to 12 carbon atoms. Exemplary conjugated dienes include, but are not limited to, butadiene, isoprene, ethyl butadiene, phenyl butadiene, piperylene, pentadiene, hexadiene, ethyl hexadiene, and dimethyl butadiene. The polymerized conjugated dienes may be used individually or as copolymers with each other. Preferably, the rubbery block L of the linear block copolymer comprises a conjugated diene selected from the group consisting of isoprene, butadiene, and any combinations thereof. In an advantageous aspect, the rubbery block L comprises a polymerized olefin, such as e.g. isobutylene.

In one aspect, at least one glassy block G comprises a polymerized monovinyl aromatic monomer. In another aspect, both glassy blocks of a triblock copolymer comprise a polymerized monovinyl aromatic monomer. In still another aspect, the linear block copolymer comprises two glassy blocks. According to still another aspect, the monovinyl aromatic monomers comprise 8 to 18 carbon atoms. Exemplary monovinyl aromatic monomers include, but are not limited to, styrene, vinylpyridine, vinyl toluene, alphamethyl styrene, methyl styrene, dimethylstyrene, ethylstyrene, diethyl styrene, t-butylstyrene, di-n-butylstyrene, isopropylstyrene, other alkylated-styrenes, styrene analogs, and styrene homologs. In yet another aspect, the monovinyl aromatic monomer is selected from the group consisting of styrene, styrene-compatible monomers or monomer blends, and any combinations thereof.

As used herein, "styrene-compatible monomers or monomer blends" refers to a monomer or blend of monomers, which may be polymerized or copolymerized, that preferentially associate with polystyrene or with the polystyrene endblocks of a block copolymer. The compatibility can arise from actual copolymerization with monomeric styrene; solubility of the compatible monomer or blend, or polymerized monomer or blend in the polystyrene phase during hot melt or solvent processing; or association of the monomer or blend with the styrene-rich phase domain on standing after processing.

In one advantageous aspect, the linear block copolymer is a diblock copolymer. In another advantageous aspect, the diblock copolymer is selected from the group consisting of styrene-isoprene, and styrene-butadiene. In an advantageous aspect, the linear block copolymer is a triblock copolymer. In still another advantageous aspect, the triblock copolymer is selected from the group consisting of styrene-isoprene-styrene, styrene-butadiene-styrene, styrene-ethylene-butylene-styrene, styrene-ethylene-propylene-styrene, styrene-isobutylene-styrene, and any combinations thereof. Diblock and triblock copolymers are commercially available, e.g., those under the trade name VECTOR available from Dexco Polymer LP, Houston, Texas; and those available under the trade name KRATON available from Kraton Polymers U.S. LLC, Houston, Texas. As manufactured and/or purchased, triblock copolymers may contain some fraction of diblock copolymer as well.

According to another advantageous aspect of the co-extruded multilayer adhesive assembly, the second pressure sensitive adhesive layer may further comprise a glassy block compatible aromatic resin having preferably a softening point value (RBSP) of at least 150° C., when measured by the ring and ball test method described in the experimental section.

In the context of the present disclosure, the expression "glassy block compatible aromatic resin" is meant to refer to an aromatic resin which is compatible with the glassy blocks, wherein the term "compatible" is as defined hereinbefore.

In an advantageous aspect, the glassy block compatible aromatic resin having a softening point value (RBSP) of at least 150° C. is compatible with each glassy block G of the multi-arm block copolymer and with the glassy block G of the optional linear block copolymer.

Any glassy block compatible aromatic resins typically included in conventional pressure-sensitive adhesive compositions may be used in the context of the present disclosure, preferably when they fulfill the above-detailed softening point requirement. Glassy block compatible aromatic resins for use herein may be easily identified by those skilled in the art, in the light of the present disclosure.

According to an advantageous aspect of the second pressure sensitive adhesive, the glassy block compatible aromatic resin for use herein has a softening point value (RBSP) of at least 155° C., at least 160° C., at least 165° C., at least 170° C., at least 180° C., at least 190° C. or even at least 200° C., when measured by the ring and ball test method described in the experimental section.

According to another advantageous aspect of the second pressure sensitive adhesive, the glassy block compatible aromatic resin for use herein has a weight average molecular weight $M_w$ of 30.000 g/mol or less, of 25.000 g/mol or less, of 20.000 g/mol or less, of 15.000 g/mol or less, or even of 10.000 g/mol or less.

In a preferred aspect, the second pressure sensitive adhesive according to the present disclosure comprises a glassy block compatible aromatic resin having a glass transition temperature (Tg) of at least 100° C., at least 110° C., at least 120° C., at least 130° C., at least 140° C., at least 150° C., or even at least 160° C.

According to an exemplary aspect of the second pressure sensitive adhesive, the glassy block compatible aromatic resin for use herein has a weight average molecular weight $M_w$ of 10.000 g/mol or less, less than 9.000 g/mol, less than 8.000 g/mol, less than 6.000 g/mol, less than 4.000 g/mol, or even less than 2.000 g/mol.

According to another exemplary aspect of the second pressure sensitive adhesive, the glassy block compatible aromatic resin for use herein has a weight average molecular weight $M_w$ of at least 1.000 g/mol, at least 2.000 g/mol, at least 3.000 g/mol, or even at least 4.000 g/mol.

According to still another exemplary aspect of the present disclosure, the second pressure sensitive adhesive comprises a glassy block compatible aromatic resin having a weight average molecular weight $M_w$ comprised in a range from 1.000 to 9.500 g/mol, or even from 2.000 to 9.000 g/mol.

According to a typical aspect, the glassy block compatible aromatic resin for use herein is essentially a hydrocarbon aromatic resin, but the disclosure is not that limited.

In a preferred aspect of the present disclosure, the glassy block compatible aromatic resin for use herein is selected from the group consisting of hydrocarbon aromatic resins, arylene oxide resins, C9-based hydrocarbon aromatic resins, C9-based hydrogenated hydrocarbon aromatic resins, polyarylene oxide resins, in particular polyphenylene oxides or polyphenylene ethers, indene coumarone resins, aromatic resins based on copolymers of C9 with maleic anhydride, and any combinations or mixtures thereof. In still a preferred aspect, the glassy block compatible aromatic resin for use herein is selected from the group consisting of hydrocarbon aromatic resins, arylene oxide resins, and any combinations thereof.

According to an advantageous aspect of the second pressure sensitive adhesive, the glassy block compatible aromatic resin for use herein is selected from the group consisting of C9-based hydrocarbon aromatic resins, C9-based hydrogenated hydrocarbon aromatic resins, polyarylene oxide resins, in particular polyphenylene oxides or polyphenylene ethers.

According to a particularly advantageous aspect of the second pressure sensitive adhesive, the glassy block compatible aromatic resin for use herein is selected from the group of C9-based hydrocarbon aromatic resins.

According to another particularly advantageous aspect of the second pressure sensitive adhesive, the glassy block compatible aromatic resin for use herein is selected from the group of polyphenylene oxides or polyphenylene ethers.

In a preferred aspect, the second pressure sensitive adhesive for use herein comprises a glassy block compatible aromatic resin having a Volatile Organic Compound (VOC) value of less than 1000 ppm, less than 800 ppm, less than 600 ppm, less than 500 ppm, or even less than 400 ppm, when measured by thermogravimetric analysis according to the weight loss test methods described in the experimental section.

In another preferred aspect, the second pressure sensitive adhesive for use in the present disclosure comprises a glassy block compatible aromatic resin having a Volatile Fogging Compound (FOG) value of less than 1500 ppm, less than 1000 ppm, less than 800 ppm, less than 600 ppm, or even less than 500 ppm, when measured by thermogravimetric analysis according to the weight loss test methods described in the experimental section.

According to typical aspect, the second pressure sensitive adhesive according to the present disclosure comprises a glassy block compatible aromatic resin in an amount which is of no greater than 20 wt %, no greater than 18 wt %, no greater than 15 wt %, or even no greater than 12 wt %, expressed as a percent by weight based on the total weight of the pressure sensitive adhesive.

According to another typical aspect of the second pressure sensitive adhesive, the total amount of the glassy block compatible aromatic resin is of no less than 2 wt %, no less than 4 wt %, or even no less than 5 wt %, expressed as a percent by weight based on the total weight of the second pressure sensitive adhesive.

According to a preferred aspect of the second pressure sensitive adhesive, the total amount of glassy block compatible aromatic resin is comprised in a range from 0.5 to 35 wt %, from 1 to 30 wt %, from 2 to 25 wt %, or even from 5 to 25 wt %, expressed as a percent by weight based on the total weight of the second pressure sensitive adhesive.

In one typical aspect of the present disclosure, the second pressure sensitive adhesive layer is free of any filler material selected from the group consisting of microspheres, expandable microspheres, preferably pentane filled expandable microspheres, gaseous cavities, glass beads, glass microspheres, glass bubbles and any combinations or mixtures thereof.

According to an advantageous aspect of the co-extruded multilayer adhesive assembly, the second pressure sensitive adhesive layer comprises:

a) from 20 wt % to 80 wt %, from 20 wt % to 70 wt %, from 25 wt % to 60 wt %, from 30 wt % to 60 wt %, or even from 35 wt % to 60 wt % of the rubber-based elastomeric material, based on the total weight of the second pressure sensitive adhesive;

b) optionally, from 20 wt % to 70 wt %, from 25 wt % to 60 wt %, or even from 25 wt % to 50 wt % of the hydrocarbon tackifier, based on the total weight of the second pressure sensitive adhesive;

c) optionally, from 2 wt % to 20 wt %, from 4 wt % to 15 wt %, from 5 wt % to 12 wt %, or even from 5 wt % to 10 wt % of a polymeric plasticizer, based on the weight of the second pressure sensitive adhesive;

d) optionally, from 20 wt % to 80 wt %, from 20 wt % to 70 wt %, from 25 wt % to 60 wt %, from 30 wt % to 60 wt %, or even from 35 wt % to 60 wt % of the linear block copolymer, based on the weight of the second pressure sensitive adhesive; and e) optionally, from 0.5 to 35 wt %, from 1 to 30 wt %, from 2 to 25 wt %, or even from 5 to 25 wt % of the glassy block compatible aromatic resin, based on the weight of the second pressure sensitive adhesive.

In one exemplary aspect, the co-extruded multilayer adhesive assembly according to the present disclosure is crosslinked, in particular with actinic radiation, more in particular with e-beam irradiation or UV irradiation. According to a typical aspect, the co-extruded multilayer adhesive assembly is crosslinked with e-beam irradiation, wherein the e-beam irradiation dose is typically comprised between 50 kGy and 150 kGy. In a further particular aspect, the e-beam irradiation is performed from both sides so as to achieve a symmetric irradiation profile within the co-extruded multilayer adhesive assembly.

While performing e-beam irradiation-based crosslinking, finding suitable e-beam irradiation dose in conjunction with selecting suitable e-beam acceleration tension will be well within the practice of those skilled in the art. Suitable acceleration tensions are typically selected and adapted to the coating weight of the corresponding co-extruded multilayer adhesive assembly. Exemplary e-beam acceleration tensions are typically comprised between 140 and 300 kV for layers with a coating weight between 25 and 1200 g/m². When irradiated from both sides, the layers may have a coating weight up to 1800 g/m².

According to one particular aspect of the disclosure, the co-extruded multilayer adhesive assembly further comprises a crosslinking additive, in particular a multifunctional (meth)acrylate or a multifunctional maleimide compound, more in particular in the pressure sensitive adhesive foam layer and/or in the second pressure sensitive adhesive layer and/or in the heat-activatable adhesive resin layer.

In the co-extruded multilayer adhesive assembly according to the present disclosure, the heat-activatable adhesive resin layer is in direct contact with the pressure sensitive adhesive foam layer, and the surface of the heat-activatable adhesive resin layer which is in direct contact with the pressure sensitive adhesive foam layer and the surface of the pressure sensitive adhesive foam layer which is in direct contact with the heat-activatable adhesive resin layer are free of any chemical or physical adhesion-promoting surface treatment.

Chemical and physical adhesion-promoting surface treatments are well known and practiced by those skilled in the art of multilayer adhesive assemblies. Typical primer compositions are described e.g. in U.S. Pat. No. 5,677,376 (Groves) and U.S. Pat. No. 5,605,964 (Groves). Alternative chemical or physical adhesion-promoting surface treatments are described e.g. in U.S. Pat. No. 4,563,388 (Bonk et al.), in EP-A1-0 384 598 (Johnson et al.), in EP-A1-1 262 532 (Valdez), and in US 2015/0159053 A1 (Schümann et al.).

According to one advantageous aspect, the co-extruded multilayer adhesive assembly of the present disclosure is free of any chemical or physical adhesion-promoting surface treatment selected from the group consisting of physical adhesion-promoting surface treatment, in particular selected from the group consisting of corona surface pre-treatments, plasma surface pre-treatments, dielectric barrier surface pre-treatments, flame surface pre-treatments, and any combinations thereof.

In another advantageous aspect, the co-extruded multilayer adhesive assembly of the present disclosure is free of any chemical or physical adhesion-promoting surface treatment selected from the group consisting of chemical adhesion-promoting surface treatment, in particular selected from the group consisting of priming layers, grafted intermediate layers, in particular ionizing-radiation grafted priming layers based on (meth)acrylic acid esters monomers or (meth)acrylamide monomers, and any combinations thereof.

According to an advantageous aspect, the co-extruded multilayer adhesive assembly has a static shear strength value of more than 2000 min, more than 4000 min, more than 6000 min, more than 8000 min, or even more than 10000 min, when measured at 70° C. according to the static shear test method described in the experimental section.

According to another advantageous aspect, the co-extruded multilayer adhesive assembly has a static shear strength value of more than 2000 min, more than 4000 min, more than 6000 min, more than 8000 min, or even more than 10000 min, when measured at 90° C. according to the static shear test method described in the experimental section.

According to still another advantageous aspect, the co-extruded multilayer adhesive assembly has a shear adhesion failure temperature (SAFT) value greater than 80° C., greater than 90° C., greater than 100° C., greater than 110° C., greater than 120° C., or even greater than 130° C., when measured according to the shear adhesion failure temperature test method described in the experimental section.

In another aspect of the present disclosure, it is provided a composite article comprising a co-extruded multilayer adhesive assembly as described above, wherein the heat-activatable adhesive resin layer has a first major surface in direct contact with the pressure sensitive polymeric foam layer and a second major surface bonded to a rubber seal article.

Rubber seal articles for use herein are not particular limited. Any rubber seal articles commonly known in the art may be used in the context of the present disclosure. Suitable rubber seal articles for use herein may be easily identified by those skilled in the art. As will be apparent to those skilled in the art, rubber seal articles are meant to designate articles based on rubber (elastomeric) material which are used for sealing applications. Exemplary rubber seal articles for use herein include, but are not limited to, rubber seal articles for use in the automotive industry. Exemplary rubber materials for use in sealing applications include, but are not limited to, EPDM, thermoplastic elastomers (TPE), thermoplastic vulcanizates (TPV), and those known under the trade designation Fortrex™ (available from Cooper Standard).

According to another advantageous aspect of the composite article, the rubber seal article for use herein is selected from the group consisting of exterior and interior parts attachment rubber seal articles and weather-strip rubber seal articles, in particular for use in the automotive industry.

According to still another advantageous aspect of the composite article, the rubber seal article for use herein is selected from the group consisting of sunroof seals, drip rail seals, water box seals, trunk seals, pinch protection seals, clamping protection seals, rear window seals, head light seals and any combinations thereof.

In a particularly advantageous aspect of the disclosure, the rubber seal article for use in the composite article is a weatherstrip rubber seal for use in automotive applications, in particular for use in automotive doors or automotive body.

In another aspect, the present disclosure is directed to a method of manufacturing a co-extruded multilayer adhesive assembly as described above, which comprises the step of hotmelt co-extruding the pressure sensitive polymeric foam layer, the heat-activatable adhesive resin layer, and optionally, the second pressure sensitive adhesive layer.

Hotmelt co-extrusion is a technique well known to those skilled in the art. Exemplary hotmelt co-extrusion processes are described e.g. in US 2003/0082362 A1 (Khandpur et al.), in US 2004/0082700 A1 (Khandpur et al.), the content of which is herewith fully incorporated by reference.

Hotmelt co-extrusion process typically involves forming a hotmelt composition, generally a polymer or blended polymeric material with a melt viscosity profile such that it can be extrusion coated on a substrate or carrier in a thin layer at a process temperature significantly above normal room temperature, but where the polymeric material retains useful pressure-sensitive adhesive characteristics at room temperature.

Exemplary processes typically involve compounding the various ingredients of each layer to a hotmelt compound. (such as e.g. block copolymers, polymeric plasticizers and hydrocarbon tackifiers). As well known in the art, compounding is typically performed in roll milling or in an extruder (such as e.g., single, screw, twin screw, planetary extruder, ring extruder, disk screw, reciprocating single screw, pin barrel single screw, etc.). Commercially available equipment such as kneaders or mixers may also be used to compound batches of the adhesive compositions. After compounding, the various prepared compositions are coextruded through a coextrusion die into a desired co-extruded multilayer adhesive assembly. The processing of the multilayer extrudate is continued through a calendar or another type of coating equipment. Because of the tacky behavior of the adhesive, it is coated on a liner and the rolls are coated with materials which do not stick to the extruded adhesive.

In a more particular aspect, the present disclosure is directed to a method of manufacturing a co-extruded multilayer adhesive assembly as described above, which comprises the steps of:
 a) compounding the rubber-based elastomeric material; optionally, the hydrocarbon tackifier; optionally, the polymeric plasticizer; and optionally, the particulate filler material thereby forming a hotmelt compound of the pressure sensitive adhesive polymeric foam layer;

b) providing a hotmelt compound of the heat-activatable layer;

c) optionally, providing a hotmelt compound of the second pressure sensitive adhesive layer;

d) hotmelt co-extruding the pressure sensitive polymeric foam layer, the heat-activatable adhesive resin layer, and optionally, the second pressure sensitive adhesive layer thereby forming a hotmelt co-extruded multilayer adhesive assembly; and e) optionally, crosslinking the hotmelt co-extruded multilayer adhesive assembly obtained in step d), in particular with actinic radiation, more in particular with e-beam irradiation.

According to one exemplary aspect method of manufacturing a co-extruded multilayer adhesive assembly, the hotmelt of the pressure sensitive polymeric foam layer comprises a filler material selected from the group consisting of expandable microspheres, expanded microspheres, glass bubbles, any combinations or mixtures thereof. According to this particular execution, the method of manufacturing a co-extruded multilayer adhesive assembly may optionally comprise the step of allowing the expandable microspheres to expand or further expand.

In a particular aspect, the method of manufacturing a co-extruded multilayer adhesive assembly comprises a multi screw hotmelt extrusion processing step, in particular a twin screw hotmelt extrusion processing step or a planetary roller extrusion step.

In a particular aspect of the method of manufacturing a co-extruded multilayer adhesive assembly, vacuum is applied to the compounded adhesive melt during the extrusion process. Vacuum can indifferently be applied to the skin compound melt and/or to the core compound melt prior to adding the foaming agent.

According to another exemplary aspect of the method of manufacturing a co-extruded multilayer adhesive assembly, a chemical entrainer is added to the compounded adhesive melt and removed later in the extrusion process. Suitable entrainers for use herein are liquids, gases or compounds that release a volatile chemical substance under the action of heat.

In another particular aspect, the method of manufacturing a co-extruded multilayer pressure sensitive adhesive assembly comprises the step of crosslinking the hotmelt co-extruded multilayer pressure sensitive adhesive assembly obtained in step d) with actinic radiation, in particular with e-beam irradiation, whereby the actinic radiation crosslinking step is applied under any of closed face (CF) or open face (OF) conditions. According to the "closed face" irradiation method, one or both faces of the hotmelt co-extruded multilayer adhesive assembly obtained in step d) are covered with a liner and the irradiation dose is applied through the liner(s). According to the "open face" irradiation method, one or both faces of the hotmelt co-extruded multilayer adhesive assembly obtained in step d) are exposed (i.e. not covered with a liner) and the irradiation dose is applied directly on the exposed adhesive surface(s).

Typically, the hotmelt co-extruded multilayer adhesive assembly is deposited on a substrate and then post cured, in particular with actinic radiation, more in particular with e-beam radiation.

In the context of manufacturing a co-extruded multilayer adhesive assembly, the various layers of the multilayer assembly are prepared as part of a single process step.

The co-extruded multilayer adhesive assembly of the present disclosure can be coated/applied upon a variety of substrates to produce adhesive-coated articles. The substrates can be flexible or inflexible and be formed of a polymeric material, paper, glass or ceramic material, metal, or combinations thereof. Foam backings may be used. Examples of other substrates include, but are not limited to, metal such as stainless steel, metal or metal oxide coated polymeric material, metal or metal oxide coated glass, and the like.

In another aspect, the present disclosure is directed to a method of manufacturing a rubber seal composite article, wherein the method comprises the steps of:

a) providing a multilayer adhesive assembly as described above, wherein the heat-activatable adhesive resin layer has a first major surface in direct contact with the pressure sensitive polymeric foam layer and a second major surface;

b) heat-laminating a rubber seal article to the second major surface of the heat-activatable adhesive resin layer.

According to another aspect, the present disclosure is directed to the use of a co-extruded multilayer adhesive assembly as described above for industrial applications, preferably for interior applications, more preferably for construction market applications and transportation market applications.

Advantageously, the co-extruded multilayer adhesive assembly as described above is used for transportation market applications, in particular automotive and aerospace applications, more in particular for taped seal on body, taped seal on door, exterior and interior parts attachment and weather-strip tape applications for the automotive industry.

Item 1 is a co-extruded multilayer adhesive assembly comprising:

a) a heat-activatable adhesive resin layer comprising a (co)polymer of one or more monomers selected from the group consisting of olefins; and b) a pressure sensitive adhesive polymeric foam layer comprising a rubber-based elastomeric material;

wherein the heat-activatable adhesive resin layer is in direct contact with the pressure sensitive adhesive foam layer, and wherein the surface of the heat-activatable adhesive resin layer which is in direct contact with the pressure sensitive adhesive foam layer and the surface of the pressure sensitive adhesive foam layer which is in direct contact with the heat-activatable adhesive resin layer are (substantially) free of any chemical or physical adhesion-promoting surface treatment.

Item 2 is a multilayer adhesive assembly according to item 1, which is obtained by (hotmelt) co-extrusion of the pressure sensitive adhesive polymeric foam layer and the heat-activatable adhesive resin layer.

Item 3 is a multilayer adhesive assembly according to any of item for 2, wherein the heat-activatable adhesive resin layer is adhesively bonded to the pressure sensitive adhesive foam layer.

Item 4 is a multilayer adhesive assembly according to any of the preceding items, wherein the heat-activatable adhesive resin comprises a (co)polymer selected from the group consisting of polyolefin homopolymers, polyolefin/polyolefin copolymers (polyallomers), and any combinations, blends or mixtures thereof.

Item 5 is a multilayer adhesive assembly according to any of the preceding items, wherein the olefin monomers are selected from the group consisting of ethylene, propylene, butylene, octylene, and any combinations or mixtures thereof.

Item 6 is a multilayer adhesive assembly according to any of the preceding items, wherein the heat-activatable adhesive resin comprises a (co)polymer selected from the group consisting of polyethylene homopolymer, polypropylene homopolymer, ethylene/propylene copolymers and any combinations, blends or mixtures thereof.

Item 7 is a multilayer adhesive assembly according to any of the preceding items, wherein the heat-activatable adhesive resin comprises a (co)polymer selected from the group consisting of ethylene/propylene copolymers and any combinations, blends or mixtures thereof.

Item 8 is a multilayer adhesive assembly according to any of the preceding items, wherein the heat-activatable adhesive resin comprises a (co)polymer selected from the group consisting of attactic, isotactic, random, block, impact copolymers, and any combinations, blends or mixtures thereof.

Item 9 is a multilayer adhesive assembly according to any of the preceding items, wherein the heat-activatable adhesive resin comprises a propylene-ethylene copolymer having in particular an ethylene content of no greater than 50 wt %, no greater than 40 wt %, no greater than 30 wt %, no greater than 20 wt %, or even no greater than 10 wt %, based on the weight of the heat-activatable adhesive resin.

Item 10 is a multilayer adhesive assembly according to any of the preceding items, wherein the heat-activatable adhesive resin comprises impact copolymers based on propylene or on polyethylene, in particular impact propylene copolymers comprising and ethylene-propylene elastomeric phase.

Item 11 is a multilayer adhesive assembly according to any of the preceding items, wherein the rubber-based elastomeric material is selected from the group consisting of natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

Item 12 is a multilayer adhesive assembly according to any of the preceding items, wherein the rubber-based elastomeric material is selected from the group consisting of synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

Item 13 is a multilayer adhesive assembly according to any of the preceding items, wherein the rubber-based elastomeric material is selected from the group consisting of halogenated butyl rubbers, in particular bromobutyl rubbers and chlorobutyl rubbers; halogenated isobutylene-isoprene copolymers; bromo-isobutylene-isoprene copolymers; chloro-isobutylene-isoprene copolymers; block copolymers; olefinic block copolymers; butyl rubbers; synthetic polyisoprene; ethylene-octylene rubbers; ethylene-propylene rubbers; ethylene-propylene random copolymers; ethylene-propylene-diene monomer rubbers; polyisobutylenes; poly(alpha-olefin); ethylene-alpha-olefin copolymers; ethylene-alpha-olefin block copolymers; styrenic block copolymers; styrene-isoprene-styrene block copolymers; styrene-butadiene-styrene block copolymers; styrene-ethylene/butadiene-styrene block copolymers; styrene-ethylene/propylene-styrene block copolymers; styrene-butadiene random copolymers; olefinic polymers and copolymers; ethylene-propylene random copolymers; ethylene-propylene-diene terpolymers, and any combinations or mixtures thereof.

Item 14 is a multilayer adhesive assembly according to any of the preceding items, wherein the rubber-based elastomeric material is selected from the group consisting of olefinic polymers and copolymers, in particular olefinic block copolymers, and any combinations, blends or mixtures thereof.

Item 15 is a multilayer adhesive assembly according to any of the preceding items, wherein the rubber-based elastomeric material comprises (or consists of) a multi-arm block copolymer of the formula $Q_n$-Y, wherein:
  i. Q represents an arm of the multi-arm block copolymer and each arm independently has the formula G-R;
  ii. n represents the number of arms and is a whole number of at least 3, in particular n is from 3 to 5, preferably n is 4; and
  iii. Y is the residue of a multifunctional coupling agent;
wherein each R is a rubbery block comprising a polymerized conjugated diene, a hydrogenated derivative of a polymerized conjugated diene, or combinations thereof; and each G is a glassy block comprising a polymerized monovinyl aromatic monomer.

Item 16 is a multilayer adhesive assembly according to item 15, wherein the multi-arm block copolymer is a star block copolymer.

Item 17 is a multilayer adhesive assembly according to any of item 15 or 16, wherein the multi-arm block copolymer is a polymodal, asymmetric star block copolymer.

Item 18 is a multilayer adhesive assembly according to any of items 15 to 17, wherein the at least one of the rubbery blocks of the multi-arm block copolymer comprises a conjugated diene selected from the group consisting of isoprene, butadiene, and any combinations thereof, preferably wherein each of the rubbery blocks of the multi-arm block copolymer comprises a conjugated diene selected from the group consisting of isoprene, butadiene, and any combinations thereof.

Item 19 is a multilayer adhesive assembly according to any of items 15 to 18, wherein at least one of the glassy blocks of the multi-arm block copolymer is a monovinyl aromatic monomer selected from the group consisting of styrene, styrene-compatible blends, and any combinations thereof, preferably wherein each of the glassy blocks of the multi-arm block copolymer is a monovinyl aromatic monomer selected from the group consisting of styrene, styrene-compatible blends, and any combinations thereof.

Item 20 is a multilayer adhesive assembly according to any of items 15 to 19, wherein at least one arm of the multi-arm block copolymer is selected from the group consisting of styrene-isoprene-styrene, styrene-butadiene-styrene, styrene-ethylene-butylene-styrene, styrene-ethylene-propylene-styrene, and combinations thereof, preferably wherein each arm of the multi-arm block copolymer is selected from the group consisting of styrene-isoprene-styrene, styrene-butadiene-styrene, styrene-ethylene-butylene-styrene, styrene-ethylene-propylene-styrene, and any combinations thereof.

Item 21 is a multilayer adhesive assembly according to any of the preceding items, wherein the pressure sensitive adhesive polymeric foam layer further comprises a hydrocarbon tackifier.

Item 22 is a multilayer adhesive assembly according to item 21, wherein the hydrocarbon tackifier is selected from the group consisting of polymeric terpenes, hetero-functional terpenes, coumarone-indene resins, esters of rosin acids, disproportionated rosin acid esters, hydrogenated rosin acids, C5 aliphatic resins, C9 hydrogenated aromatic resins, C5/C9 aliphatic/aromatic resins, dicyclopentadiene resins, hydrogenated hydrocarbon resins arising from C5/C9 and dicyclopentadiene precursors, hydrogenated styrene monomer resins, and blends thereof.

Item 23 is a multilayer adhesive assembly according to any of item 21 or 22, wherein the hydrocarbon tackifier is primarily compatible with the rubbery blocks of the multi-arm block copolymer as described in any of items 15 to 20.

Item 24 is a multilayer adhesive assembly according to any of items 21 to 23, wherein the hydrocarbon tackifier has a Volatile Organic Compound (VOC) value of less than 1000 ppm, less than 800 ppm, less than 600 ppm, less than 400 ppm or even less than 200 ppm, when measured by thermogravimetric analysis according to the weight loss test methods described in the experimental section.

Item 25 is a multilayer adhesive assembly according to any of items 21 to 24, wherein the hydrocarbon tackifier has a Volatile Fogging Compound (FOG) value of less than 1500 ppm, less than 1000 ppm, less than 800 ppm, less than 600 ppm, or even less than 500 ppm, when measured by thermogravimetric analysis according to the weight loss test methods described in the experimental section.

Item 26 is a multilayer adhesive assembly according to any of the preceding items, wherein the pressure sensitive adhesive polymeric foam layer further comprises a polymeric plasticizer, in particular having a weight average molecular weight Mw of at least 10.000 g/mol, at least 15.000 g/mol, at least 20.000 g/mol, or even at least 30.000 g/mol.

Item 27 is a multilayer adhesive assembly according to item 26, wherein the polymeric plasticizer has a weight average molecular weight $M_w$ of 100.000 g/mol or less, less than 90.000 g/mol, less than 80.000 g/mol, less than 70.000 g/mol, less than 60.000 g/mol, less than 50.000 g/mol, or even less than 40.000 g/mol.

Item 28 is a multilayer adhesive assembly according to any of item 26 or 27, wherein the polymeric plasticizer has a weight average molecular weight $M_w$ in a range from 10.000 to 80.000 g/mol, from 20.000 to 70.000 g/mol, from 25.000 to 65.000 g/mol, from 25.000 to 60.000 g/mol, from 30.000 to 60.000 g/mol, or even from 30.000 to 55.000 g/mol.

Item 29 is a multilayer adhesive assembly according to any of items 26 to 28, wherein the polymeric plasticizer has a Volatile Organic Compound (VOC) value of less than 1000 ppm, less than 800 ppm, less than 600 ppm, less than 400 ppm or even less than 200 ppm, when measured by thermogravimetric analysis according to the weight loss test methods described in the experimental section.

Item 30 is a multilayer adhesive assembly according to any of items 26 to 29, wherein the polymeric plasticizer has a Volatile Fogging Compound (FOG) value of less than 2500 ppm, less than 2000 ppm, less than 1500 ppm, less than 1000 ppm, less than 800 ppm, less than 600 ppm, or even less than 500 ppm, when measured by thermogravimetric analysis according to the weight loss test method described in the experimental section.

Item 31 is a multilayer adhesive assembly according to any of items 26 to 30, wherein the polymeric plasticizer is selected from the group consisting of polyisobutylene plasticizers, liquid polybutadiene plasticizers, liquid polyisoprene plasticizers, liquid isoprene-butadiene-styrene copolymers plasticizers, ethylene propylene diene monomer plasticizers, liquid hydrocarbon resins, and any combinations or mixtures or hydrogenated versions thereof.

Item 32 is a multilayer adhesive assembly according to any of items 26 to 31, wherein the polymeric plasticizer is a polyisobutylene plasticizer.

Item 33 is a multilayer adhesive assembly according to any of the preceding items, wherein the pressure sensitive adhesive polymeric foam layer further comprises a particulate filler material which is preferably selected from the group consisting of microspheres, expandable microspheres, preferably pentane filled expandable microspheres, gaseous cavities, glass beads, glass microspheres, glass bubbles and any combinations or mixtures thereof.

Item 34 is a multilayer adhesive assembly according to item 33, wherein the particulate filler material is selected from the group consisting of expandable microspheres, glass bubbles, and any combinations or mixtures thereof.

Item 35 is a multilayer adhesive assembly according to any of the preceding items, wherein the pressure sensitive adhesive polymeric foam layer comprises from 20 wt % to 80 wt %, from 20 wt % to 70 wt %, from 25 wt % to 60 wt %, from 30 wt % to 60 wt %, or even from 35 wt % to 60 wt % of the rubber-based elastomeric material, based on the total weight of the pressure sensitive adhesive polymeric foam.

Item 36 is a multilayer adhesive assembly according to any of items 21 to 35, wherein the pressure sensitive adhesive polymeric foam layer comprises from 20 wt % to 70 wt %, from 25 wt % to 60 wt %, or even from 25 wt % to 50 wt % of the hydrocarbon tackifier, based on the total weight of the pressure sensitive adhesive polymeric foam.

Item 37 is a multilayer adhesive assembly according to any of items 26 to 36, wherein the pressure sensitive adhesive polymeric foam layer comprises from 1 wt % to 40 wt %, from 2 wt % to 30 wt %, from 5 wt % to 30 wt %, or even from 10 wt % to 25 wt % of the polymeric plasticizer, in particular a polyisobutylene plasticizer, based on the total weight of the pressure sensitive adhesive polymeric foam.

Item 38 is a multilayer adhesive assembly according to any of the preceding items, wherein the pressure sensitive adhesive polymeric foam layer comprises:
a) from 20 wt % to 80 wt %, from 20 wt % to 70 wt %, from 25 wt % to 60 wt %, from 30 wt % to 60 wt %, or even from 35 wt % to 60 wt % of the rubber-based elastomeric material, based on the total weight of the pressure sensitive adhesive polymeric foam;
b) optionally, from 20 wt % to 70 wt %, from 25 wt % to 60 wt %, or even from 25 wt % to 50 wt % of the hydrocarbon tackifier, based on the total weight of the pressure sensitive adhesive polymeric foam;
c) optionally, from 1 wt % to 40 wt %, from 2 wt % to 30 wt %, from 5 wt % to 30 wt %, or even from 10 wt % to 25 wt % of the polymeric plasticizer, in particular a polyisobutylene plasticizer, based on the total weight of the pressure sensitive adhesive polymeric foam; and d) optionally, from 2 wt % to 30 wt %, from 2 wt % to 20 wt %, or even from 2 wt % to 15 wt % of the particulate filler material preferably selected from the group of expandable microspheres and glass bubbles, based on the weight of the pressure sensitive adhesive polymeric foam.

Item 39 is a multilayer adhesive assembly according to any of the preceding items, wherein the pressure sensitive adhesive polymeric foam layer is (substantially) free of poly(meth)acrylates.

Item 40 is a multilayer adhesive assembly according to any of the preceding items, wherein the pressure sensitive adhesive polymeric foam layer is (substantially) free of any crosslinking additive, in particular free of multifunctional (meth)acrylate compounds.

Item 41 is a multilayer adhesive assembly according to any of items 1 to 39, wherein the pressure sensitive adhesive polymeric foam layer further comprises a crosslinking additive, in particular a multifunctional (meth)acrylate or a multifunctional maleimide compound.

Item 42 is a multilayer adhesive assembly according to any of the preceding items, wherein the pressure sensitive adhesive polymeric foam layer has a thickness in a range from 100 to 6000 micrometers, from 400 to 3000 micrometers, or even from 800 to 2000 micrometers.

Item 43 is a multilayer adhesive assembly according to any of the preceding items, wherein the pressure sensitive adhesive polymeric foam layer has a first major surface and a second major surface, wherein the heat-activatable adhesive resin layer is in direct contact with (bonded to) the first major surface of the pressure sensitive adhesive polymeric foam layer, wherein the multilayer pressure sensitive adhesive assembly further comprises a second pressure sensitive adhesive layer bonded to the second major surface of the pressure sensitive adhesive polymeric foam layer.

Item 44 is a multilayer adhesive assembly according to item 43, which is obtained by hotmelt co-extrusion of the pressure sensitive polymeric foam layer, the heat-activatable adhesive resin layer and the second pressure sensitive adhesive layer, wherein the second pressure sensitive adhesive layer is preferably in direct contact with the second major surface of the pressure sensitive adhesive polymeric foam layer, and wherein the second major surface of the pressure sensitive adhesive polymeric foam layer and the surface of the second pressure sensitive adhesive layer which is in direct contact with the second major surface pressure sensitive adhesive polymeric foam layer are (substantially) free of any chemical or physical adhesion-promoting surface treatment.

Item 45 is a multilayer adhesive assembly according to any of item 43 or 44, wherein the second pressure sensitive adhesive layer comprises a polymer base material selected from the group consisting of rubber-based elastomeric materials, polyacrylates, polyurethanes, polyolefins, polyamides, polyesters, polyethers, polyisobutylene, polystyrenes, polyvinyls, polyvinylpyrrolidone, silicones, and any combinations, copolymers or mixtures thereof.

Item 46 is a multilayer adhesive assembly according to item 45, wherein the second pressure sensitive adhesive layer comprises a polymer base material selected from the group consisting of rubber-based elastomeric materials.

Item 47 is a multilayer adhesive assembly according to item 46, wherein the second pressure sensitive adhesive layer has a composition as described in any of items 11 to 42.

Item 48 is a multilayer adhesive assembly according to item 47, wherein the second pressure sensitive adhesive layer further comprises a linear block copolymer of the formula L-(G)$_m$, wherein L is a rubbery block comprising a polymerized olefin, a polymerized conjugated diene, a hydrogenated derivative of a polymerized conjugated diene, or any combinations thereof; wherein each G is a glassy block comprising a polymerized monovinyl aromatic monomer; and wherein m is 1 or 2.

Item 49 is a multilayer adhesive assembly according to item 48, wherein the rubbery block of the linear block copolymer comprises a conjugated diene selected from the group consisting of isoprene, butadiene, ethyl butadiene copolymers, and any combinations thereof.

Item 50 is a multilayer adhesive assembly according to any of item 48 or 49, wherein the rubbery block of the linear block copolymer comprises a conjugated diene selected from the group consisting of isoprene, butadiene, and any combinations thereof.

Item 51 is a multilayer adhesive assembly according to any of items 48 to 50, wherein at least one glassy block of the linear block copolymer is a mono vinyl aromatic monomer selected from the group consisting of styrene, styrene-compatible blends, and any combinations thereof.

Item 52 is a multilayer adhesive assembly according to any of items 48 to 51, wherein the linear block copolymer comprises two glassy blocks.

Item 53 is a multilayer adhesive assembly according to any of items 48 to 52, wherein the linear block copolymer is selected from the group consisting of styrene-isoprene-styrene, styrene-butadiene-styrene, styrene-ethylene-butadiene-styrene, and any combinations thereof.

Item 54 is a multilayer adhesive assembly according to any of items 48 to 53, wherein the linear block copolymer is a styrene-isoprene-styrene block copolymer.

Item 55 is a multilayer adhesive assembly according to any of items 48 to 54, wherein the second pressure sensitive adhesive layer further comprises a glassy block compatible aromatic resin having preferably a softening point value (RBSP) of at least 150° C., at least 155° C., at least 160° C., at least 165° C., at least 170° C., at least 180° C., at least 190° C. or even at least 200° C., when measured by the ring and ball test method described in the experimental section.

Item 56 is a multilayer adhesive assembly according to item 55, wherein the glassy block compatible aromatic resin has a glass transition temperature (Tg) of at least 100° C., at least 110° C., at least 120° C., at least 130° C., at least 140° C., at least 150° C., or even at least 160° C.

Item 57 is a multilayer adhesive assembly according to any of item 55 or 56, wherein the glassy block compatible aromatic resin has a weight average molecular weight $M_w$ in a range from 1.000 to 9.500 g/mol, or even from 2.000 to 9.000 g/mol.

Item 58 is a multilayer adhesive assembly according to any of items 55 to 57, wherein the glassy block compatible aromatic resin is essentially a hydrocarbon aromatic resin.

Item 59 is a multilayer adhesive assembly according to any of items 55 to 58, wherein the glassy block compatible aromatic resin is selected from the group consisting of hydrocarbon aromatic resins, arylene oxide resins, C9-based hydrocarbon aromatic resins, C9-based hydrogenated hydrocarbon aromatic resins, polyarylene oxide resins, in particular polyphenylene oxides or polyphenylene ethers, indene coumarone resins, aromatic resins based on copolymers of C9 with maleic anhydride, and any combinations or mixtures thereof.

Item 60 is a multilayer adhesive assembly according to any of items 55 to 59, wherein the glassy block compatible aromatic resin is selected from the group consisting of hydrocarbon aromatic resins, arylene oxide resins, and any combinations thereof.

Item 61 is a multilayer adhesive assembly according to any of items 55 to 60, wherein the glassy block compatible aromatic resin is selected from the group consisting of C9-based hydrocarbon aromatic resins, C9-based hydrogenated hydrocarbon aromatic resins, polyarylene oxide resins, in particular polyphenylene oxides or polyphenylene ethers.

Item 62 is a multilayer adhesive assembly according to any of items 55 to 61, wherein the glassy block compatible aromatic resin is selected from the group of C9-based hydrocarbon aromatic resins.

Item 63 is a multilayer adhesive assembly according to any of items 55 to 62, wherein the glassy block compatible aromatic resin is selected from the group of polyphenylene oxides or polyphenylene ethers.

Item 64 is a multilayer adhesive assembly according to any of items 55 to 63, wherein the glassy block compatible aromatic resin has a Volatile Organic Compound (VOC) value of less than 1000 ppm, less than 800 ppm, less than 600 ppm, less than 500 ppm, or even less than 400 ppm, when measured by thermogravimetric analysis according to the weight loss test methods described in the experimental section.

Item 65 is a multilayer adhesive assembly according to any of items 55 to 64, wherein the glassy block compatible aromatic resin has a Volatile Fogging Compound (FOG) value of less than 1500 ppm, less than 1000 ppm, less than 800 ppm, less than 600 ppm, or even less than 500 ppm, when measured by thermogravimetric analysis according to the weight loss test methods described in the experimental section.

Item 66 is a multilayer adhesive assembly according to any of items 43 to 65, wherein the second pressure sensitive adhesive layer comprises:

a) from 20 wt % to 80 wt %, from 20 wt % to 70 wt %, from 25 wt % to 60 wt %, from 30 wt % to 60 wt %, or even from 35 wt % to 60 wt % of the rubber-based elastomeric material, based on the total weight of the second pressure sensitive adhesive;

b) optionally, from 20 wt % to 70 wt %, from 25 wt % to 60 wt %, or even from 25 wt % to 50 wt % of the hydrocarbon tackifier, based on the total weight of the second pressure sensitive adhesive;

c) optionally, from 2 wt % to 20 wt %, from 4 wt % to 15 wt %, from 5 wt % to 12 wt %, or even from 5 wt % to 10 wt % of a polymeric plasticizer, based on the weight of the second pressure sensitive adhesive;

d) optionally, from 20 wt % to 80 wt %, from 20 wt % to 70 wt %, from 25 wt % to 60 wt %, from 30 wt % to 60 wt %, or even from 35 wt % to 60 wt % of the linear block copolymer, based on the weight of the second pressure sensitive adhesive; and e) optionally, from 0.5 to 35 wt %, from 1 to 30 wt %, from 2 to 25 wt %, or even from 5 to 25 wt % of the glassy block compatible aromatic resin, based on the weight of the second pressure sensitive adhesive.

Item 67 is a multilayer assembly according to any of items 43 to 66, wherein the second pressure sensitive adhesive layer is (substantially) free of any filler material selected from the group consisting of microspheres, expandable microspheres, preferably pentane filled expandable microspheres, gaseous cavities, glass beads, glass microspheres, glass bubbles and any combinations or mixtures thereof.

Item 68 is a multilayer assembly according to any of items 43 to 67, wherein the second pressure sensitive adhesive layer has a thickness in a range from 20 to 1500 micrometers, from 20 to 1000 micrometers, from 20 to 500 micrometers, from 30 to 400 micrometers, from 30 to 250 micrometers, from 40 to 200 micrometers, or even from 50 to 150 micrometers.

Item 69 is a multilayer adhesive assembly according to any of items 43 to 68, which is in the form of a skin/core/skin multilayer adhesive assembly, wherein the pressure sensitive adhesive polymeric foam layer is the core layer of the multilayer adhesive assembly, the heat-activatable adhesive resin layer is first skin layer of the multilayer adhesive assembly and the second pressure sensitive adhesive layer is the second skin layer of the multilayer adhesive assembly.

Item 70 is a multilayer adhesive assembly according to any of the preceding items, which is crosslinked, in particular with actinic radiation, more in particular with e-beam irradiation or UV irradiation.

Item 71 is a multilayer adhesive assembly according to any of the preceding items, which further comprises a crosslinking additive, in particular a multifunctional (meth)acrylate or a multifunctional maleimide compound, more in particular in the second pressure sensitive adhesive layer or in the heat-activatable adhesive resin layer.

Item 72 is a multilayer adhesive assembly according to any of the preceding items, wherein the chemical or physical adhesion-promoting surface treatment are selected from the group consisting of physical adhesion-promoting surface treatment, in particular selected from the group consisting of corona surface pre-treatments, plasma surface pre-treatments, dielectric barrier surface pre-treatments, flame surface pre-treatments, and any combinations thereof.

Item 73 is a multilayer adhesive assembly according to any of the preceding items, wherein the chemical or physical adhesion-promoting surface treatment are selected from the group consisting of chemical adhesion-promoting surface treatment, in particular selected from the group consisting of priming layers, grafted intermediate layers, in particular ionizing-radiation grafted priming layers based on (meth)acrylic acid esters monomers or (meth)acrylamide monomers, and any combinations thereof.

Item 74 is a multilayer adhesive assembly according to any of the preceding items, which has a static shear strength value of more than 2000 min, more than 4000 min, more than 6000 min, more than 8000 min, or even more than 10000 min, when measured at 70° C. according to the static shear test method described in the experimental section.

Item 75 is a multilayer adhesive assembly according to any of the preceding items, which has a static shear strength value of more than 2000 min, more than 4000 min, more than 6000 min, more than 8000 min, or even more than 10000 min, when measured at 90° C. according to the static shear test method described in the experimental section.

Item 76 is a multilayer adhesive assembly according to any of the preceding items, which has a shear adhesion failure temperature (SAFT) value greater than 80° C., greater than 90° C., greater than 100° C., greater than 110° C., greater than 120° C., or even greater than 130° C., when measured according to the shear adhesion failure temperature test method described in the experimental section.

Item 77 is a composite article comprising a multilayer adhesive assembly according to any of the preceding items, wherein the heat-activatable adhesive resin layer has a first major surface in direct contact with the pressure sensitive polymeric foam layer and a second major surface bonded to a rubber seal article.

Item 78 is a composite article according to item 77, wherein the rubber seal article is selected from the group consisting of exterior and interior parts attachment rubber seal articles and weather-strip rubber seal articles, in particular for use in the automotive industry.

Item 79 is a composite article according to any of item 77 or 78, wherein the rubber seal article is selected from the group consisting of sunroof seals, drip rail seals, water box seals, trunk seals, pinch protection seals, clamping protection seals, rear window seals, head light seals and any combinations thereof.

Item 80 is a composite article according to any of items 77 to 79, wherein the rubber seal article is a weather-strip rubber seal for use in automotive applications, in particular for use in automotive doors or automotive body.

Item 81 is a method of manufacturing a multilayer adhesive assembly according to any of the preceding items, which comprises the step of hotmelt co-extruding the pressure sensitive polymeric foam layer, the heat-activatable adhesive resin layer, and optionally, the second pressure sensitive adhesive layer.

Item 82 is a method according to item 81, which comprises the steps of:
a) compounding the rubber-based elastomeric material; optionally, the hydrocarbon tackifier; optionally, the polymeric plasticizer; and optionally, the particulate filler material thereby forming a hotmelt compound of the pressure sensitive adhesive polymeric foam layer;
b) providing a hotmelt compound of the heat-activatable layer;
c) optionally, providing a hotmelt compound of the second pressure sensitive adhesive layer;
d) hotmelt co-extruding the pressure sensitive polymeric foam layer, the heat-activatable adhesive resin layer, and optionally, the second pressure sensitive adhesive layer thereby forming a hotmelt co-extruded multilayer adhesive assembly; and
e) optionally, crosslinking the hotmelt co-extruded multilayer adhesive assembly obtained in step d), in particular with actinic radiation, more in particular with e-beam irradiation.

Item 83 is a method according to any of item 81 or 82, which comprises a multi screw hotmelt extrusion processing step, in particular a twin screw hotmelt extrusion processing step or a planetary roller extrusion step.

Item 84 is a method according to any of items 81 to 83, which comprises the step of crosslinking the hotmelt co-extruded multilayer adhesive assembly obtained in step d) with actinic radiation, in particular with e-beam irradiation, whereby the actinic radiation crosslinking step is applied under any of closed face (CF) or open face (OF) conditions.

Item 85 is a method of manufacturing a rubber seal composite article, wherein the method comprises the steps of:
a) providing a multilayer adhesive assembly according to any of items 1 to 76, wherein the heat-activatable adhesive resin layer has a first major surface in direct contact with the pressure sensitive polymeric foam layer and a second major surface;
b) heat-laminating a rubber seal article to the second major surface of the heat-activatable adhesive resin layer.

Item 86 is the use of a multilayer adhesive assembly according to any of items 1 to 76 for industrial applications, preferably for interior applications, more preferably for construction market applications and transportation market applications.

Item 87 is the use according to item 86 for transportation market applications, in particular automotive and aerospace applications, more in particular for taped seal on body, taped seal on door, exterior and interior parts attachment and weather-strip tape applications for the automotive industry.

Examples

The present disclosure is further illustrated by the following examples. These examples are merely for illustrative purposes only and are not meant to be limiting on the scope of the appended claims.

Test Methods Applied:

TGA Test Method

The TGA (Thermogravimetric Analysis) measurements are performed with a Q5000 IR equipment from Texas Instruments. The samples are weighed in a platinum pan and placed with an auto sampler in the oven of the apparatus. The nitrogen flow through the oven is 25 mL/min, the nitrogen flow through the balance is 10 mL/min. The temperature is equilibrated at 30° C. and is held for 15 minutes. Then the temperature is increased to 90° C. with a ramp of 60° C./min. The 90° C. are then held for 30 minutes. In a next step, the temperature is increased to 120° C. with a ramp of 60° C./min. The 120° C. are held for 60 minutes. The weight losses during 30 minutes at 90° C. (VOC analysis) and during 60 minutes at 120° C. (FOG analysis) are recorded.

The test is then completed by increasing the temperature to 800° C. with a ramp of 10° C./min. Then, the temperature is equilibrated at 600° C., the oven is purged with air and the temperature is increased to 900° C. with a ramp of 10° C./min.

Oven Outgassing Test Method

A measure for the outgassing of raw material samples is accomplished by weighing 10 g of the selected raw material into an aluminum cup with a precision of 0.1 mg. Prior to this step, the aluminum cup is already weighed out with a precision in the range of 0.1 mg. The weighed-in test sample is then placed into a forced air oven for 2 hours at 120° C. or 2 hours at 160° C. Once the sample is removed from the oven, it is allowed to cool at ambient temperature (23° C.+/−2° C.) for 30 minutes before weighing the filled aluminum cup again. The weight loss of the sample before and after oven drying is calculated and recorded in %.

Thermal Desorption Analysis of Organic Emissions According to VDA Test Method 278

VDA method 278 is a test method used for the determination of organic emissions from non-metallic trim components used to manufacture the interior of motor vehicles (VDA stands for "Verband der Automobilindustrie", the German Association of Automobilists). The method classifies the emitted organic compounds into two groups:

VOC value—the sum of volatile and semi-volatile compounds up to n-$C_{25}$ and

FOG value—the sum of the semi-volatile and heavy compounds from n-$C_{14}$ to n-$C_{32}$ For measuring the VOC and FOG values, adhesive samples of 30 mg+/−5 mg are weighed directly into empty glass sample tubes. The volatile and semi-volatile organic compounds are extracted from the samples into the gas stream and are then re-focused onto a secondary trap prior to injection into a GC for analysis. An automated thermal desorber (Markes International Ultra-UNITY system) is hereby used for the VDA 278 testing.

The test method comprises two extraction stages:

VOC analysis, which involves desorbing the sample at 90° C. for 30 minutes to extract VOC's up to n-$C_{25}$. This is followed by a semi-quantitative analysis of each compound as □□g toluene equivalents per gram of sample.

FOG analysis, which involves desorbing the sample at 120° C. for 60 minutes to extract semi-volatile compounds ranging from n-$C_{14}$ to n-$C_{32}$. This is followed by semi-quantitative analysis of each compound as □g hexadecane equivalents per gram of sample.

The VOC values expressed are the average of two measurements per sample. The higher value of the measurements is indicated as the result, as described in the VDA278 test method. In order to determine the FOG value, the second sample is retained in the desorption tube after the VOC analysis and reheated to 120° C. for 60 minutes.

90°-Peel-Test at 300 Mm/Min (According to Finat Test Method No. 2, 8th Edition 2009)

Multilayer pressure sensitive adhesive assembly strips according to the present disclosure and having a width of 10 mm and a length >120 mm are cut out in the machine direction from the sample material.

For test sample preparation, the heat activatable adhesive resin layer side is covered with a coated aluminum strip (available from Alcan) having the following dimension 22 cm×1.6 cm, 0.13 mm thickness and heat pressed at 180° C. for 10 seconds under a load of 2 bar. During this step the heat activatable layer melts and adheres to the coated aluminum strip. Then, the pressure sensitive adhesive side of each assembly is placed, after removal of the liner, on a clean test panel using light finger pressure. Next, the test samples are rolled twice with a standard FINAT test roller (weight 6.8 kg) at a speed of approximately 10 mm per second to obtain intimate contact between the adhesive mass and the surface. After applying the pressure sensitive adhesive assembly strips to the test panel, the test samples are allowed to dwell for 24 h at ambient room temperature (23° C.+/−2° C., 50% relative humidity+/−5%) prior to testing.

For peel testing, the test samples are in a first step clamped in the lower movable jaw of a Zwick tensile tester (Model Z020 commercially available from Zwick/Roell GmbH, Ulm, Germany). The multilayer pressure sensitive adhesive film strips are folded back at an angle of 90° and their free ends grasped in the upper jaw of the tensile tester in a configuration commonly utilized for 90° measurements. The tensile tester is set at 300 mm per minute jaw separation rate. Test results are expressed in Newton per 10 mm (N/10 mm). The quoted peel values are the average of two 90°-peel measurements.

Static Shear Test at 70° C. or 90° C. with 500G (Finat Test Method No. 8, 8th Edition 2009)

The test is carried out at 70° C. or 90° C. Test specimens are cut out having a dimension of 12.7 mm by 25.4 mm. The heat activatable adhesive resin layer side of the multilayer assembly was placed on a coated aluminum strip (available from Alcan) of 16 mm width and heat pressed at 180° C. for 10 seconds under a load of 2 bar. During this step the heat activatable layer melts and adheres to the coated aluminum strip. The pressure sensitive adhesive side is applied onto the test substrate panel (clear coat CC5) having the following dimensions: 50 mm×50 mm×1 mm. A loop is formed with the free end of the aluminum strip and fixed with 2 cramps.

Next, the test samples are rolled twice with a standard FINAT test roller (weight 6.8 kg) at a speed of approximately 10 mm per second to obtain intimate contact between the adhesive mass and the surface. After applying the pressure sensitive adhesive assembly strips to the test panel, the test samples are allowed to dwell for 24 h at ambient room temperature (23° C.+/−2° C., 50% relative humidity+/−5%) prior to testing.

Each sample is then placed into a vertical shear-stand (+2° disposition) at 70° C. or 90° C. with automatic time logging. After 10 minutes dwell time in the oven, a 500 g weight is hung into the hole of the aluminum plate. The time until failure is measured and recorded in minutes. Target value is 10.000 minutes. Per test specimen two samples are measured. A recorded time of "10000+" indicates that the adhesive does not fail after 10000 min.

Ring and Ball Test Method

The softening point value of the glassy block compatible aromatic resin is determined according to Test Method ASTM E28-14.

Shear Adhesion Failure Temperature (SAFT)

The sample preparation for SAFT tests is as described above for the static shear test @ 70° C. or 90° C. The test specimens are hung in a programmable air forced oven and a weight of 500 g is hung into the loop. The starting temperature is 23° C. and the temperature is increased by 10° C. every hour until reaching 130° C. The temperature at which the weight falls is recorded in ° C.

Test Substrates Used for Testing:

The multilayer pressure sensitive adhesive adhesives and assemblies according to the present disclosure are tested for their adhesive properties on the following automotive clear coat panel: CeramiClear5 ("CC5") coated panels available from PPG Industries.

The upper-mentioned automotive clear coat includes acrylic resins and polyesters used alone or with mixtures of copolymers comprising hydroxy- or glycidyl-functionalities or carbamatic acid residues (groups); or copolymers of acrylic acid and methacrylic acid esters with hydroxyl groups, free acid groups and further co-monomers (e.g. styrene). Panels are cut prior to 90° peel and shear testing to the requested dimension.

Before testing, the automotive clear coat coated panels are cleaned with a 1:1 mixture of isopropyl alcohol and distilled water. Test panels are then wiped dry with a paper tissue.

Raw Materials Used:

The raw materials and commercial adhesive tapes used are summarized in Table 1 below.

TABLE 1

Raw Material List.

| Name | Description | Supplier |
|---|---|---|
| EX4011 | Black Acrylic foam tape with a thickness of 1100 micrometers | 3M |
| GTE6212 | Black Acrylic foam tape with a thickness of 1200 micrometers | 3M |
| ACX 7065 | Black Acrylic foam tape with a thickness of 1200 micrometers | Tesa |
| Kraton D1340 | Polymodal asymmetric SIS star block copolymer | Kraton polymers |
| Kraton D1161 | Linear block copolymer (15% Styrene, 19% Diblock) | Kraton polymers |
| Escorez 1304 | Aliphatic hydrocarbon resin | Exxon Mobil |
| Escorez 5340 | Cycloaliphatic hydrocarbon resin | Exxon Mobil |
| Escorez 5320 | Cycloaliphatic hydrocarbon resin | Exxon Mobil |
| Escorez 5615 | aliphatic/aromatic hydrocarbon resin | Exxon Mobil |
| Regalite R9100 | Partially hydrogenated resin | Eastman |
| Regalite R1090 | Fully hydrogenated resin | Eastman |
| Regalite 1125 | Fully hydrogenated resin | Eastman |
| Piccotac 1020E | Liquid aliphatic hydrocarbon resin | Eastman |
| Novares C120 | Indene coumarone resin | Rüttgers |
| Novares C140 | Indene coumarone resin | Rüttgers |
| Novares T140M | glassy block compatible aromatic resin; RBSP of 140° C. | Rüttgers |
| Novares TN170 | glassy block compatible aromatic resin; RBSP of 170° C., Tg of 120° C. | Rüttgers |
| Plastolyn R 1140 | Fully hydrogenated resin | Eastman |
| Nyplast 222B | Mineral Oil | Nynas |
| Glissopal 1000 | Polyisobutylene of Mw = 1600 g/mol | BASF |
| Glissopal V1500 | Polyisobutylene of Mw = 4140 g/mol | BASF |
| Oppanol B10N | Polyisobutylene of $M_W$ = 36000 g/mol | BASF |
| Oppanol B12N | Polyisobutylene of $M_W$ = 51000 g/mol | BASF |
| EMS FN100MD | Expandable microspheres | Lehmann & Voss |
| Irganox 1010 | Heat stabilizer | BASF |
| Renol Schwarz | Carbon Black Masterbatch in EVA | Clariant |

Screening of Raw Materials with Regard to Low VOC:

In order to screen the raw materials in advance concerning their outgassing behavior and thermal stability, an oven outgassing test, as described in the previous test method part, is performed at 120° C. and 160° C. Results are provided in Table 2 below.

TABLE 2

| Raw Material | weight loss 2 h 120° C. (%) | weight loss 2 h 160° C. (%) |
|---|---|---|
| Regalite 9100 | 0.15 | 2.53 |
| Regalite 1090 | 0.25 | 4.99 |
| Escorez 5615 | 0.04 | 0.21 |
| Escorez 1304 | 0.06 | 0.52 |
| Piccotac 1020E | 0.20 | 1.12 |
| Oppanol B10N | 0.05 | 0.22 |
| Oppanol B12N | — | 0.07 |

In Table 2, the tackifying hydrocarbon resins Escorez 5615 and Escorez 1304 show a very low outgassing at 120° C. and a very good thermal stability at 160° C. In contrast, Regalite R9100 and R1090 show higher outgassing behavior at 120° C. and a significant weight loss at 160° C. The weight loss at 160° C. provides a good indication of the thermal stability of a raw material and its behavior when processed at high temperatures in a hot melt type process.

Concerning the plasticizers, both of the polyisobutylene resins Oppanol B10N and B12N show very low outgassing behavior when compared to the liquid hydrocarbon resin Piccotac 1020E and excellent heat stability at 160° C. Based on these findings a pre-selection concerning low VOC behavior can be envisaged.

Another way of pre-screening the raw materials concerning their improved low VOC behavior is by TGA (thermogravimetric analysis) measurements, as previously described in the test method section. Results of the TGA measurements are found in Table 3 below, the values are an average of 2 measurements. These include also a comparison to an existing and commercially available acrylic adhesive-based foam tape.

TABLE 3

| Raw Material | Weight loss 30 min at 90° C. (in ppm) | Weight loss 60 min at 120° C. (in ppm) |
|---|---|---|
| ACX 7065 | 1974 ± 13 | 5732 ± 112 |
| Kraton D1340 | 326 ± 76 | 234 ± 99 |
| Kraton D1161 | 669 ± 47 | 253 ± 101 |
| Regalite 9100 | 1353 ± 223 | 10905 ± 1325 |
| Regalite 1090 | 2409 ± 457 | 20792 ± 284 |
| Regalite 1125 | 1472 ± 134 | 2037 ± 296 |
| Escorez 1304 | 296 ± 64 | 1476 ± 155 |
| Escorez 5615 | 258 ± 153 | 727 ± 180 |
| Escorez 5340 | 335 ± 35 | 590 ± 43 |
| Escorez 5320 | 334 ± 1 | 1124 ± 68 |
| Plastolyn R1140 | 344 ± 15 | 541 ± 10 |
| Novares C120 | 1000 ± 29 | 5849 ± 116 |
| Novares C140 | 757 ± 2 | 1376 ± 113 |
| Nyplast 222B | 1225 ± 231 | 16817 ± 1664 |
| Glissopal 1000 | 8730 ± 622 | 18363 ± 658 |
| Glissopal V1500 | 2310 ± 148 | 4419 ± 206 |
| Oppanol B10N | 558 ± 75 | 1707 ± 274 |
| Oppanol B12N | 285 ± 34 | 538 ± 25 |

From Table 3, the difference in outgassing of polymeric plasticizers in function of their weight average molecular weight Mw can be further seen. While the polyisobutylene plasticizer Oppanol B12N with 51000 g/mol has very low outgassing at 90 and 120° C., Glissopal 1000 and V1500 which are polyisobutylenes having a weight average molecular weight Mw of respectively 1600 and 4140 g/mol have very high amounts of volatile organic compounds.

Current commercially available acrylic-based PSA foam tapes exhibit high levels of VOCs and Fog values when analyzed with the TGA test method. The acrylic PSA foam tape ACX 7065 has a weight loss of 1974 ppm after 30 minutes at 90° C. and 5732 ppm of weight loss after further 60 minutes at 120° C.

The combination of oven outgassing test results with TGA test results clearly indicates favorable selections of raw materials for low VOC multilayer pressure sensitive adhesive assemblies.

Example Preparation (3-Layer Coextruded PSA Assemblies): Second Pressure Sensitive Adhesive Layer(s) Preparation ("Skin Layer")

Pressure sensitive skin adhesive formulations with compositions as described in Table 4, are compounded in a 25 mm co-rotating twin screw extruder (ZSK25 from Werner & Pfleiderer, Stuttgart, Germany) having 11 heat zones and a L/D (length/diameter) ratio of 46.

TABLE 4

| | Skin1 (S1) | | Skin2 (S2) | | Skin3 (S3) | |
|---|---|---|---|---|---|---|
| Kraton D1340 | 31.85 | Blend 1 | 31.85 | Blend 1 | 31.85 | Blend 1 |
| Kraton D1161 | 13.65 | | 13.65 | | 13.65 | |
| Irganox 1010 | 1.35 | | 1.35 | | 1.35 | |
| Escorez 5615 | 36.50 | | 36.50 | | 44 | |
| Novares TN170 | 7.50 | | — | | — | |
| Novares T140M | — | | 7.50 | | — | |
| Oppanol B12N | 7.35 | | 7.35 | | 7.35 | |

The temperature profile and the extrusion conditions for making the second pressure sensitive adhesive layer ("skin layers") are described in Table 5 for skin layers 1-3. The screw speed of the twin screw extruder is set at 300 rpm for producing these skin layers.

In a first step Kraton D 1340, Kraton 1161 and Irganox1010 are blended in a tumbling mixer resulting in Blend 1. Blend 1 is then fed into the twin screw extruder at Zone Z2 using a loss in weight twin screw feeder from K-Tron. The tackifier resin Escorez 5615 is added at Zone Z2 as well using a loss in weight screw feeder available from Brabender. Novarez TN170 and T140M are fed in Zone 4 using a loss in weight feeder from Brabender and a side stuffer from Coperion. Oppanol B12N is fed in Zone Z6 using a 20 L drum unloader (available as Robatech RMC20).

TABLE 5

| Zone (Barrel) | Temperature (° C.) | Description |
|---|---|---|
| Z1 | 50 | |
| Z2 | 30 | Feeding of Blend1 (Kraton1340, Kraton 1161, Irganox1010) and Escorez 5615 |
| Z3 | 50 | |
| Z4 | 130 | Feeding of Novares TN170 and T140M with a loss in weight feeder with a side stuffer. |
| Z5 | 160 | |
| Z6 | 160 | Feeding of Oppanol B12N using a drum unloader RMC 20 |
| Z7 | 160 | |
| Z8 | 160 | |
| Z9 | 160 | |
| Z10 | 160 | |
| Z11 | 160 | |
| Gear pump | 165 | |
| Hose | 170 | |
| Outer channels of 3 Layer Die | 160 | Coating of the 3-layer adhesive assembly |

PSA Polymeric Foam Layer

The pressure sensitive adhesive polymeric foam layer formulation is described in Table 6 and is compounded in a 26 mm corotating twin screw extruder (ZSK25 from Werner& Pfleiderer, Stuttgart, Germany) having 13 heat zones and a L/D (length/diameter) ratio of 46.

TABLE 6

| Foam 1 | | |
|---|---|---|
| Kraton D1340 | 45 | Blend 2 |
| Irganox 1010 | 1.35 | |
| Carbon Black MB | 0.40 | |
| Escorez 5615 | 40 | |
| Oppanol B12N | 15 | |
| EMS | 3.25 | |

The temperature profile of the extruder and the extrusion conditions are described later in Table 7 for the making of Foam 1. The twin screw extruder is operated at a speed of 370 rpm. In a first step, Kraton D1340 is blended with Irganox 1010 and Carbon Black MB in a tumbling mixer resulting in Blend 2. Blend 2 is then fed into the twin screw extruder at Zone Z1 using a loss in weight feeder (Brabender). The hydrocarbon tackifier resin Escorez 5615 is added in Zone Z1 as well, using a loss in weight screw feeder from Brabender. In Zone Z6, the plasticizer Oppanol B12N is fed using a 20 L drum unloader (GX23 from SM Klebetechnik). The expandable microspheres FN100MD are then finally added in Zone Z10 via side stuffer from Werner& Pfleiderer fed by a loss in weight twin screw feeder (MiniTwin from Brabender). Between the extruder and the die, the adhesive melt is metered by a gear pump (150° C.) through a heated hose (150° C.), which makes the junction between the extruder and the die. The temperature of the coating die is set at 160° C. The expandable microspheres are only allowed to expand after passing the 3-layer die at the end of the extrusion line, leading to a 3-layer multilayer pressure sensitive assembly.

TABLE 7

| Zone (Barrel) | Temperature (° C.) | Description |
|---|---|---|
| Z1 | 40 | Feeding of Blend 2 (Kraton D 1340, Irganox 1010 and Carbon Black MB) using a loss in weight twin screw feeder from Brabender. Feeding of Escorez 5615 using a loss in weight feeder from Brabender. |
| Z2 | 50 | |
| Z3 | 70 | |
| Z4 | 120 | |
| Z5 | 140 | |
| Z6 | 150 | Feeding of Oppanol B12N using a 20 L drum unloader (GX23 from SM Klebetechnik). |
| Z7 | 150 | |
| Z8 | 150 | |
| Z9 | 150 | |
| Z10 | 150 | Feeding of EMS FN100MD using a gravimetric loss in weight twin screw feeder from Brabender and a twin-screw side stuffer from Werner & Pfleiderer. |
| Z11 | 120 | |
| Z12 | 120 | |
| Z13 | 120 | |
| Gear pump | 150 | |
| Hose | 150 | |
| Middle channel of 3 Layer Die | 160 | Coating and expansion of the microspheres. |

Heat Activatable Adhesive Layer (H1)

The heat activatable adhesive layer (H1) is an impact polypropylene (PP7035E4, commercially available from Exxon Mobile) that is extruded by a standard single screw extruder having a diameter of 22 mm and an L/D ratio of 26.

The single screw extruder is provided with 5 heat zones. The temperature profile and the extrusion conditions for making the heat activatable adhesive layer are described in Table 8. The screw speed of the extruder is set at 74 rpm leading to a melt throughput of 4.3 kg/h. The Polypropylene melt passes the second outer channel of the 3-layer manifold die.

TABLE 8

| Zone (Barrel) | Temperature (° C.) |
| --- | --- |
| Z1 (hopper) | Cooled |
| Z2 | 180 |
| Z3 | 220 |
| Z4 | 220 |
| Z5 | 220 |
| Hose | 220 |
| Outer channel of 3 Layer Die | 160 |

Examples Preparation:

As multilayer adhesive assemblies according to the present disclosure (Examples 1-3), 3-layer co-extruded tapes are prepared by co-extruding the heat-activatable adhesive resin layer and the second pressure sensitive adhesive layer onto the opposing sides of a polymeric foam layer through a 3-layer multi manifold film die. The 3-layer co-extruded pressure sensitive adhesive assemblies are cast between a casting roll and a siliconized PET liner entrained by a second chill roll. The chill rolls are cooled with water at a temperature of about 13° C. Once cooled down the co-extruded adhesive assemblies adhere to the silicone coated PET liner and are wound up in a winding station. The 3-layer co-extruded adhesive assemblies already had sufficient dimensional stability when wound up, deeming additional in-line e-beam crosslinking optional.

The 3-layer adhesive assembly examples used for mechanical testing, are described later in Table 9. Hereby, 3-layer co-extruded pressure sensitive adhesive assemblies are exposed to open face e-beaming conditions (OF). Under these conditions, the multilayer assemblies are e-beamed from both sides after removing the release liner on top of the first pressure sensitive adhesive layer. E-beaming takes place from both sides with an acceleration tension of 250 kV and a dose of 80 kGy.

Table 9 further includes two comparative unprimered laminated adhesive assemblies (CE1-CE2) where the heat-activatable adhesive resin layer (HAAL) is laminated as follows:

1) HAAL is laminated on the VR1 side of a 3-layer EX4011 double-coated acrylic foam tape (Example CE1); and 2) HAAL is laminated directly on the acrylic polymeric foam layer a 2-layer GTE6212 single-coated acrylic foam tape (Example CE2).

These assemblies are not exposed to e-beam crosslinking.

TABLE 9

| Example | "Skin" layer | Foam layer | Heat-activatable layer |
| --- | --- | --- | --- |
| Ex. 1 | S1 | Foam 1 | H1 |
| Ex. 2 | S2 | Foam 1 | H1 |
| Ex. 3 | S3 | Foam 1 | H1 |
| CE1 | Laminated as described above | | H1 |

TABLE 9-continued

| Example | "Skin" layer | Foam layer | Heat-activatable layer |
| --- | --- | --- | --- |
| CE2 | Laminated as described above | | H1 |

Mechanical Test Results of Multilayer Adhesive Assembly Examples: 90° Peel, Static Shear (SS) at 90° C. and SAFT Test Results 90° Peel test results, Static Shear test results at 90° C. and SAFT test results of the examples are shown in Table 10 below.

TABLE 10

| Example No | 90° Peel to CC5 (N/cm) | Failure Mode | Statis Shear at 90° C. on CC5 (min) | Failure Mode | SAFT (° C.) |
| --- | --- | --- | --- | --- | --- |
| Ex. 1 (coextruded) | 42 | FS | >10000 | | >130 |
| Ex. 2 (coextruded) | 46 | FS | >10000 | | >130 |
| Ex. 3 (coextruded) | 32 | PO | >10000 | | >130 |
| Ex. CE1 (laminated) | 4 | 2B | 33 | 2B | n.d. |
| Ex. CE2 (laminated) | 8 | 2B | 73 | 2B | n.d. |

2B denotes two-bond e.g. delamination of the HAAL from the core.

FS denotes foam split

PO denotes pop-off

The peel, static shear and SAFT performances of all coextruded examples according to the disclosure are very high on automotive clear coats (CeramiClear5). In contrast, for comparative examples CE1 and CE2, which are not co-extruded but laminated adhesive assemblies, the constructions failed in the 90° C. static shear test after a few minutes with a 2-bond failure. This is due to the heat-activatable adhesive layer delaminating from the core at elevated temperature. The comparative examples also exhibit poor 90° peel adhesion performance.

The invention claimed is:

1. A co-extruded multilayer adhesive assembly comprising a coextruded assembly, wherein the coextruded assembly comprises:

a) a heat-activatable adhesive resin layer comprising a (co)polymer of one or more monomers selected from the group consisting of olefins; and b) a pressure sensitive adhesive polymeric foam layer comprising a rubber-based elastomeric material;

wherein the heat-activatable adhesive resin layer is in direct contact with the pressure sensitive adhesive foam layer, and wherein the surface of the heat-activatable adhesive resin layer which is in direct contact with the pressure sensitive adhesive foam layer and the surface of the pressure sensitive adhesive foam layer which is in direct contact with the heat-activatable adhesive resin layer are free of any chemical or physical adhesion-promoting surface treatment.

2. The multilayer adhesive assembly according to claim 1, wherein the heat-activatable adhesive resin comprises a (co) polymer selected from the group consisting of polyolefin homopolymers, polyolefin/polyolefin copolymers, and any combinations, blends or mixtures thereof.

3. The multilayer adhesive assembly according to claim 1, wherein the heat-activatable adhesive resin comprises a (co) polymer selected from the group consisting of polyethylene homopolymer, polypropylene homopolymer, ethylene/propylene copolymers and any combinations, blends or mixtures thereof.

4. The multilayer adhesive assembly according to claim 1, wherein the rubber-based elastomeric material is selected from the group consisting of natural rubbers, synthetic rubbers, thermoplastic elastomeric materials, non-thermoplastic elastomeric materials, thermoplastic hydrocarbon elastomeric materials, non-thermoplastic hydrocarbon elastomeric materials, and any combinations or mixtures thereof.

5. The multilayer adhesive assembly according to claim 1, wherein the rubber-based elastomeric material comprises a multi-arm block copolymer of the formula $Q_n$-Y, wherein:

i. Q represents an arm of the multi-arm block copolymer and each arm independently has the formula G-R;

ii. n represents the number of arms and is a whole number of at least 3, in particular n is from 3 to 5, preferably n is 4; and iii. Y is the residue of a multifunctional coupling agent; wherein each R is a rubbery block comprising a polymerized conjugated diene, a hydrogenated derivative of a polymerized conjugated diene, or combinations thereof; and each G is a glassy block comprising a polymerized monovinyl aromatic monomer.

6. The multilayer adhesive assembly according to claim 1, wherein the pressure sensitive adhesive polymeric foam layer further comprises a hydrocarbon tackifier.

7. The multilayer adhesive assembly according to claim 1, wherein the pressure sensitive adhesive polymeric foam layer further comprises a polymeric plasticizer.

8. The multilayer adhesive assembly according to claim 7, wherein the polymeric plasticizer has a weight average molecular weight Mw of at least 10,000 g/mol.

9. The multilayer adhesive assembly according to claim 1, wherein the pressure sensitive adhesive polymeric foam layer has a first major surface and a second major surface, wherein the heat-activatable adhesive resin layer is in direct contact with the first major surface of the pressure sensitive adhesive polymeric foam layer, wherein the multilayer pressure sensitive adhesive assembly further comprises a second pressure sensitive adhesive layer bonded to the second major surface of the pressure sensitive adhesive polymeric foam layer.

10. The multilayer adhesive assembly according to claim 9, wherein the second pressure sensitive adhesive layer comprises a polymer base material selected from the group consisting of rubber-based elastomeric materials, polyacrylates, polyurethanes, polyolefins, polyamides, polyesters, polyethers, polyisobutylene, polystyrenes, polyvinyls, polyvinylpyrrolidone, silicones, and any combinations, copolymers or mixtures thereof.

11. The multilayer adhesive assembly according to claim 9, wherein the second pressure sensitive adhesive layer comprises a polymer base material selected from the group consisting of rubber-based elastomeric materials.

12. The multilayer adhesive assembly according to claim 1, wherein the chemical or physical adhesion-promoting surface treatment are selected from the group consisting of physical adhesion-promoting surface treatment.

13. The multilayer adhesive assembly according to claim 12, wherein the physical adhesion-promoting surface treatment is selected from the group consisting of corona surface pre-treatments, plasma surface pre-treatments, dielectric barrier surface pre-treatments, flame surface pre-treatments, and any combinations thereof.

14. The multilayer adhesive assembly according to claim 1, which has a static shear strength value of more than 2000 min when measured at 70° C. according to the static shear test method described in the experimental section.

15. A composite article comprising the multilayer adhesive assembly according to claim 1, wherein the heat-activatable adhesive resin layer has a first major surface in direct contact with the pressure sensitive polymeric foam layer and a second major surface bonded to a rubber seal article.

16. A method of manufacturing the multilayer adhesive assembly according to claim 1, which comprises the step of hotmelt co-extruding the pressure sensitive polymeric foam layer, the heat-activatable adhesive resin layer, and optionally, a second pressure sensitive adhesive layer.

* * * * *